United States Patent
Hernandez et al.

(10) Patent No.: US 11,922,620 B2
(45) Date of Patent: Mar. 5, 2024

(54) UAV SURVEYING SYSTEM AND METHODS

(71) Applicant: Shake N Bake LLC, Vermilion, OH (US)

(72) Inventors: Hermilo Hernandez, Rockford, MN (US); Eric Wayne Jackson, Rockford, MN (US); Richard Linchangco, Rockford, MN (US)

(*) Notice: Subject to any disclaimer, the term of this patent is extended or adjusted under 35 U.S.C. 154(b) by 432 days.

(21) Appl. No.: 17/012,715

(22) Filed: Sep. 4, 2020

(65) Prior Publication Data
US 2021/0166376 A1 Jun. 3, 2021

Related U.S. Application Data

(60) Provisional application No. 62/897,434, filed on Sep. 9, 2019, provisional application No. 62/895,902, filed on Sep. 4, 2019.

(51) Int. Cl.
*G06T 7/00* (2017.01)
*B64C 39/02* (2023.01)
(Continued)

(52) U.S. Cl.
CPC .......... *G06T 7/0012* (2013.01); *B64C 39/024* (2013.01); *G05D 1/0094* (2013.01);
(Continued)

(58) Field of Classification Search
CPC .......... G03B 37/04; G06T 2207/10032; G06T 3/4038; G06T 2207/30188; G06T 2200/32;
(Continued)

(56) References Cited

U.S. PATENT DOCUMENTS 7,729,561 B1 * 6/2010 Boland .................. G06V 20/13
382/109
7,782,327 B2 8/2010 Gonzalez et al.
(Continued)

FOREIGN PATENT DOCUMENTS

CN 109660721 A 4/2019
JP 2022066907 A * 5/2022
(Continued)

OTHER PUBLICATIONS

Byrne et al. "Maximizing feature detection in aerial unmanned aerial datasets", 2017, J. Appl. Rem. Sens. 11(2) 025015 doi: 10.1117/1.JRS.11.025015, Published in: Journal of Applied Remote Sensing vol. 11, Issue 2, pp. 025015-1-21.*
(Continued)

*Primary Examiner* — Guillermo M Rivera-Martinez
(74) *Attorney, Agent, or Firm* — Robert Nupp

(57) ABSTRACT

Disclosed herein are systems, methods, and non-transitory computer-readable storage media that allow a user to easily generate survey mission plans for one or more UAVs and to capture high quality survey images, including those in the near infra-red, and stitch them into an orthomosaic having reduced geometric distortion. The generation of such orthomosaics allows the systems and methods disclosed herein to be particularly useful in applications where separation from the background of high reflective near infrared surfaces is important, such as identifying plants on soil and generating vegetation indices for precision agriculture applications.

19 Claims, 20 Drawing Sheets

(51) Int. Cl.
| | |
|---|---|
| *G05D 1/00* | (2006.01) |
| *G06F 16/587* | (2019.01) |
| *G06T 1/20* | (2006.01) |
| *G06T 1/60* | (2006.01) |
| *G06T 5/00* | (2006.01) |
| *G06T 5/50* | (2006.01) |
| *G06V 20/10* | (2022.01) |
| *B64U 10/13* | (2023.01) |
| *B64U 101/30* | (2023.01) |

(52) U.S. Cl.
CPC ............ *G05D 1/104* (2013.01); *G06F 16/587* (2019.01); *G06T 1/20* (2013.01); *G06T 1/60* (2013.01); *G06T 3/4038* (2013.01); *G06T 5/006* (2013.01); *G06T 5/50* (2013.01); *G06V 20/188* (2022.01); *B64U 10/13* (2023.01); *B64U 2101/30* (2023.01); *G06T 2207/10036* (2013.01); *G06T 2207/30188* (2013.01)

(58) Field of Classification Search
CPC .......... G06T 2207/10036; G06V 20/17; G06V 20/188; G06V 10/16; G06V 10/20
See application file for complete search history.

(56) References Cited

U.S. PATENT DOCUMENTS

| | | | |
|---|---|---|---|
| 8,515,609 | B2 | 8/2013 | McAndrew et al. |
| 9,821,910 | B1 | 11/2017 | Suiter et al. |
| 10,021,299 | B2 | 7/2018 | Tsang et al. |
| 2001/0038718 | A1* | 11/2001 | Kumar ...................... G06T 7/35 |
| | | | 382/284 |
| 2003/0036827 | A1 | 2/2003 | Murphy |
| 2003/0193589 | A1* | 10/2003 | Lareau ................. H04N 5/3743 |
| | | | 348/294 |
| 2012/0170842 | A1* | 7/2012 | Liu ........................... G06T 5/50 |
| | | | 382/167 |
| 2014/0267390 | A1* | 9/2014 | Padwick ................... G06T 7/30 |
| | | | 345/629 |
| 2014/0316614 | A1* | 10/2014 | Newman ............ G06Q 30/0611 |
| | | | 705/26.4 |
| 2016/0214715 | A1 | 7/2016 | Meffert |
| 2016/0229555 | A1* | 8/2016 | Millin .................... G06T 3/4038 |
| 2016/0307447 | A1* | 10/2016 | Johnson ............. H04B 7/18506 |
| 2017/0248969 | A1* | 8/2017 | Ham ...................... G08G 5/0021 |
| 2017/0287184 | A1 | 10/2017 | Pettersson |
| 2018/0218533 | A1* | 8/2018 | Millin .................. G08G 5/0013 |
| 2018/0350054 | A1* | 12/2018 | Fox ...................... G08G 5/0069 |
| 2018/0357909 | A1 | 12/2018 | Eyhorn |
| 2018/0372493 | A1 | 12/2018 | Pilkington et al. |
| 2019/0026554 | A1* | 1/2019 | Rainey ................. G06V 20/188 |
| 2019/0155973 | A1* | 5/2019 | Morczinek ............... G06N 3/08 |
| 2020/0004272 | A1* | 1/2020 | Pilskalns ............... G01S 19/43 |
| 2020/0051443 | A1* | 2/2020 | Zhao ..................... G08G 5/0034 |
| 2020/0098130 | A1* | 3/2020 | Porter .................. G06V 20/182 |
| 2020/0130864 | A1* | 4/2020 | Brockers ................ B60L 53/37 |
| 2021/0034075 | A1* | 2/2021 | Daniel ................. G05D 1/1064 |

FOREIGN PATENT DOCUMENTS

| | | |
|---|---|---|
| WO | WO 2012033658 A2 | 3/2012 |
| WO | WO 2017099568 A1 | 6/2017 |
| WO | WO 2018104700 A1 | 6/2018 |

OTHER PUBLICATIONS

Lucier et al. "Automatic UAV Image Registration Using Feature Detection and Matching with Satellite Imagery ", 2018, Massachusetts Institute of Technology 2018, pp. 1-46.*

Salami et al., "On-the-Fly Olive Tree Counting Using a UAS and Cloud Services", 2019, Remote Sens. 2019, 11, 316, doi.org/10.3390/rs11030316, pp. 1-21.*

Yahyanejad et al., "Incremental, orthorectified and loop-independent mosaicking of aerial images taken by micro UAVs," 2011 IEEE International Symposium on Robotic and Sensors Environments (ROSE), Montreal, QC, Canada, 2011, pp. 137-142, doi: 10.1109/ROSE.2011.6058531.*

International Search Report and Written Opinion, dated Dec. 17, 2020, received in International Application No. PCT/US2020/049335.

User Manual, Mavic Pro V2.0 (DJI) (2017).

User Manual, DJI GS Pro V2.0 (DJI) (2018).

* cited by examiner

UAV SURVEYING SYSTEM AND METHODS

CLAIM OF PRIORITY AND CROSS REFERENCE

This application claims benefit of priority under 35 U.S.C. § 119(e) to U.S. Provisional Application Nos. 62/895,902, filed on Sep. 4, 2019, and 62/897,434, filed on Sep. 9, 2019, the entire contents and disclosures of which are incorporated herein by reference. Cross reference is made to copending International Application No. PCT/US20/49335 which is assigned to the same assignee as the present application and is filed concurrently herewith, and which is hereby incorporated by reference.

TECHNICAL FIELD

The present disclosure relates to UAV surveying systems, methods, and applications, including UAV mission planning, image capture, and orthomosaic stitching aspects.

BACKGROUND

Unmanned aerial vehicles (UAVs) exist in a multitude of forms, such as multirotor copters, and may be utilized in a multitude of applications. Certain UAVs are capable of carrying payloads that permit surveying or scouting an area, such as optical sensor payloads, pesticide atomizers/sprayers, and seed spreaders.

It is important for farmers and others to be able to survey crops in the field at different stages of the growth cycle to obtain information and metrics for a number of different purposes. For example, growers may wish to understand the NDVI index that correlates to vegetation health for a field at a given time. In other situations, the grower may wish to have a visual count of shoots or crop counts in order to predict yield data. In other instances, the grower may wish to have visual information indicative of the nutrients of the field over time. In other survey applications, a construction management company, for example, may wish to survey a work site to provide a visual indication of the status of a project. Still other survey applications may include, for example, ranchers who wish to fly one or multitude of UAVs to count the number of cattle present in a herd. Still other applications may include growers who wish to fly one or a multitude of UAVs to spray pesticides at advantageous times over their fields.

A difficulty in using UAVs for certain applications is the difficulty inherent in building a mission or flight plan for the UAV or UAVs to execute. This is especially apparent when the user is not normally accustomed to programming or otherwise configuring automation machines. Accordingly, there exists a need for a system and method to easily build a mission or flight plan for one or more UAVs to execute. In particular, there is a need for a system and method to easily build a mission or flight plan for one or more UAVs to overfly and survey an area, such as one or more crop fields of irregular shape.

In some cases, the area to be surveyed is of significant size and/or the amount of data to be gathered is significant, such that the mission or flight plan is to be executed by more than one UAV. In such cases, it is desirable for the system and method to be able to automatically build multiple, complementary mission or flight plans to accomplish the survey. In some cases, it is also desirable for the system and method to be able to facilitate the creation of and/or automate the creation of multiple, complementary mission or flight plans that are characterized by geometrically-simple flight patterns.

Another difficulty arising in UAV surveying applications is the ability to continuously capture high quality, overlapping survey images that are each georeferenced, because of the timescale needed by many devices to capture and store such georeferenced data.

Yet another difficulty arising in UAV surveying applications is the ability to stitch a base set of survey images into an orthomosaic in a manner that minimizes lens/geometric distortion inherently present in captured images.

In some cases, the number and types of tasks involved in a flight mission (e.g., image capture, geolocation of image data) are processor-intensive and can therefore tend to unduly slow the mission by requiring undue amount of processor time and power. In such cases, it is desirable for the system and method to be optimized for efficient processor usage.

BRIEF DESCRIPTION OF THE DRAWINGS

The present disclosure, in accordance with one or more various embodiments, is described in detail with reference to the following drawings. The drawings are provided for purpose of illustration only and merely depict aspects of typical or example embodiments. These drawings are provided to facilitate the reader's understanding of the disclosure and shall not be considered limiting of the breadth, scope, or applicability of the disclosure.

The components in the drawing are not necessarily drawn to scale. In the drawings, like reference numerals designate corresponding parts throughout the several views. One of ordinary skill in the art will appreciate that a component may be designed as multiple components or that multiple components may be designed as a single component.

DETAILED DESCRIPTION

Figure 1:
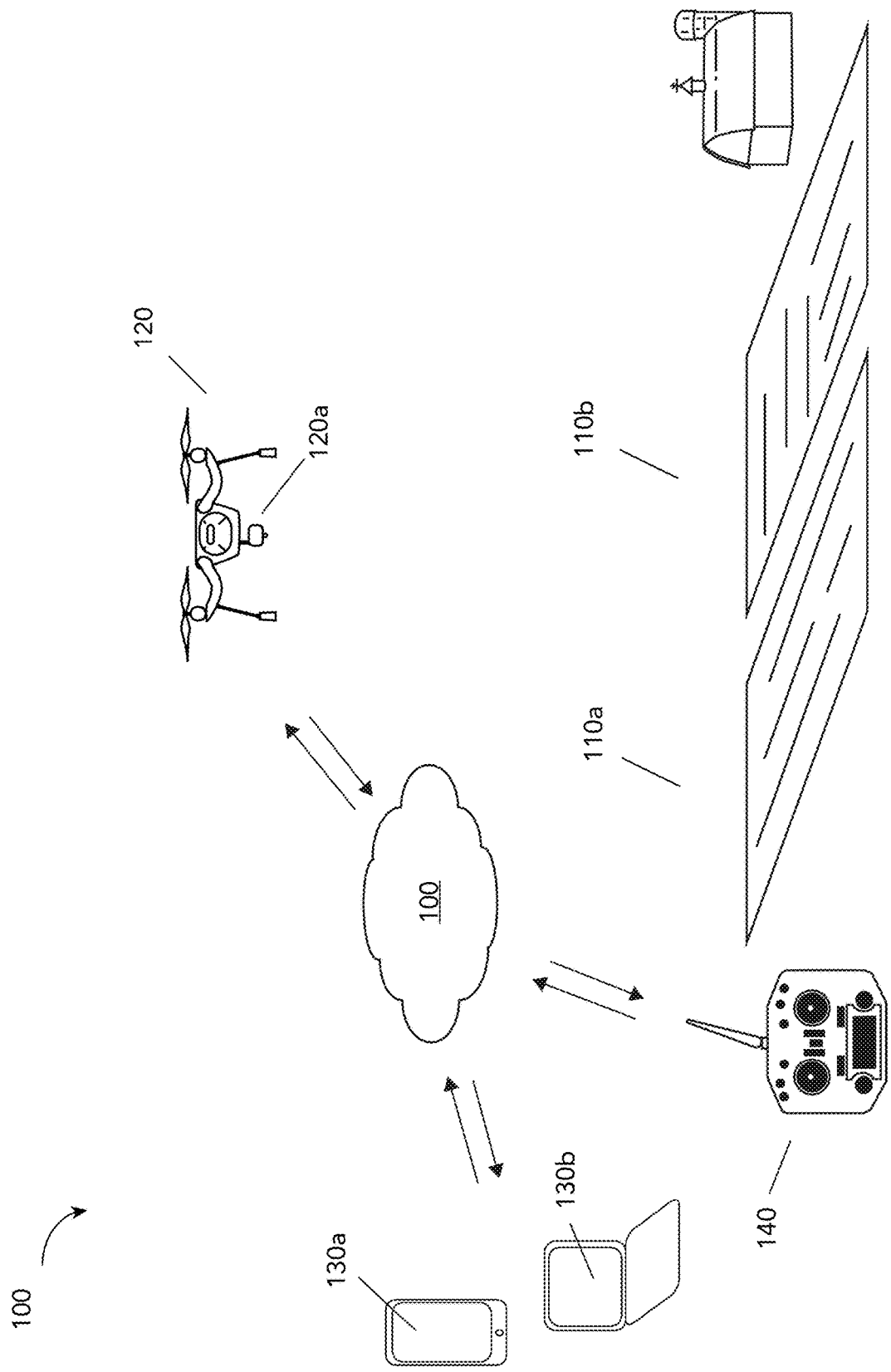
FIG. 1 is a diagram illustrating components of an exemplary environment for the system and methods of the present disclosure.

The novel system and methods of the embodiments described herein allow users to quickly and easily build UAV mission plans for use in overflying areas of different sizes and complexities, in a manner that is partially automated and that requires, in some embodiments, as little as one parameter (e.g., altitude) to be set by a user. In some embodiments, the user-selected parameter(s) are presented to a user via a correlated parameter that is tailored to the survey content (e.g., crop type). In particular, in one or more embodiments described herein, the mission plan is intended to provide for an aerial survey of an area to gather image data of crops or other ground artifacts of variable size and complexity. In one or more embodiments, the system and methods automatically generate a mission plan that is divided into a plurality of coordinated sub-plans to load onto a plurality of UAVs or a single UAV to be flown in serial fashion. In some embodiments, the sub-plans use flight paths having relatively simple and/or predetermined geometry.

The novel system and methods of embodiments described herein also allow users to quickly and easily capture a base set of high resolution, georeferenced and overlapping images of a survey area (e.g., one or more crop fields) and to generate an orthomosaic from the base set of images that has reduced lens distortion, thereby providing for improved metrics and analytics using the orthomosaic.

It should be understood that aspects, features or functions that are described in relation to an embodiment are not necessarily limited to the embodiment described, but rather may be applicable to one or more embodiments, unless expressly described otherwise. Also, the description set forth herein is not to be construed as limited to the embodiments shown. Rather, it is appreciated that various modifications may occur to those skilled in the art that, while not specifically set forth herein, are nevertheless within the spirit and scope of the description. When an embodiment is described as "exemplary" (or similarly) herein, it is to be understood as one non-limiting example embodiment, and does not preclude other embodiments that may not include the limitations described in the exemplary embodiment As may be appreciated by one of skill in the art, aspects of the embodiments described herein may be employed as a system, method or computer program product. Accordingly, aspects may take the form of a hardware embodiment, a software embodiment (including firmware) or an embodiment combining hardware and software that may all generally be referred to herein as a "module," "component," or "system." Further, aspects of the disclosed embodiments may take the form of a computer program product embodied in one or more computer readable medium(s) having computer readable program code or instructions represented thereon.

As also may be appreciated by one of skill in the art, aspects of the embodiments described herein as functions, routines, algorithms or methods may be implemented in software. The software may comprise computer executable code/instructions stored on computer readable media. Multiple functions may be performed in one or more modules as desired, and the embodiments described are merely examples. The software may be executed on one or more DSP, CPU, GPU, ASIC, FPGA, SoC, microprocessors, or other type of processors operating on one or more computer systems or processor environments, such as a personal computer, server, PaaS, or other computing system.

When dealing with software embodiments, the embodiments are not dependent on any particular software language or type of language, unless context suggests otherwise, and in general any suitable programming language may be employed. When dealing with APIs or similar software constructs, modules may be described abstractly using functional language or using pseudocode or other high level description. Modules generally each contain one or more routines that may or may not be separately described. In object-oriented languages like Python, Java or C++, a class may typically correspond to a module, while a method may typically correspond to a routine. In procedural languages, such as C, functions, subroutines, or procedures may typically correspond to routines, while collections of routines that handle related data may typically correspond to modules. Modules may be expressed explicitly in some languages, implicitly in others (e.g., as a file), while in other languages there may be no corresponding construct, but instead a module may be regarded as simply a grouping of routines.

With reference to FIG. 1, a general operating environment 100 of the mission-planning systems and methods of the present disclosure is illustrated. As shown, operating environment 100 may contain one or more areas to be surveyed 110a,b (shown in FIG. 1 as two crop fields), one or more UAVs 120 (shown here as a quadcopter with a camera payload), as well as one or more user devices 130 and remote wireless controller 140. In one or more embodiments, user device 130 may be any suitable machine sufficient to run one or more aspects of the mission-planning system described herein and provide functionality described herein. Non-limiting examples may include a smartphone (e.g., iPhone®), a notebook computer (e.g., Apple iPad®, Samsung Note®), laptop computer, etc. In one or more embodiments described herein, UAV 120 carries a payload 120a comprising a camera/camera system or optical sensor (which terms are used interchangeably herein unless context suggests otherwise) for collecting overlapping images of the surveyed area. Other exemplary payloads may include storage tanks and atomizers/sprayers for spraying, e.g., pesticides, on fields, as well as seed bins/spreaders for spreading seeds over a field.

In general, the UAV airframe and design of the present disclosure may be any suitable type sufficient to implement the system and method embodiments described herein. Non-limiting examples may include multirotor helicopters (e.g., quadrotors, hexarotors, octaorotors), standard planes, flying wings, and plane-a-tails. Unless context suggests otherwise herein, the embodiments of the present disclosure contemplate multirotor helicopters.

Generally, an automated or semi-automated UAV requires a mission plan in order to operate. A mission plan may generally refer to any mission-specific information and data that a UAV's flight controller (and in some embodiments one or more relevant auxiliary controllers, e.g., payload sensor processor) utilizes to carry out a flight mission over a delimited area. Non-limiting examples of mission plan information and data may include plot information (e.g., centerpoint location and shape information), autopilot/controller information (e.g., height/altitude setting, default speed setting, overlap setting, sidelap setting), and flight plan information (e.g., home location, default heading information, ordered list of flight path waypoints). In many contexts, a flight plan may generally refer to a subset of mission plan information and data, such as waypoint and heading information and data. However, unless context suggests otherwise, the terms "mission plan" and "flight plan" may be used interchangeably herein.

Figure 2:
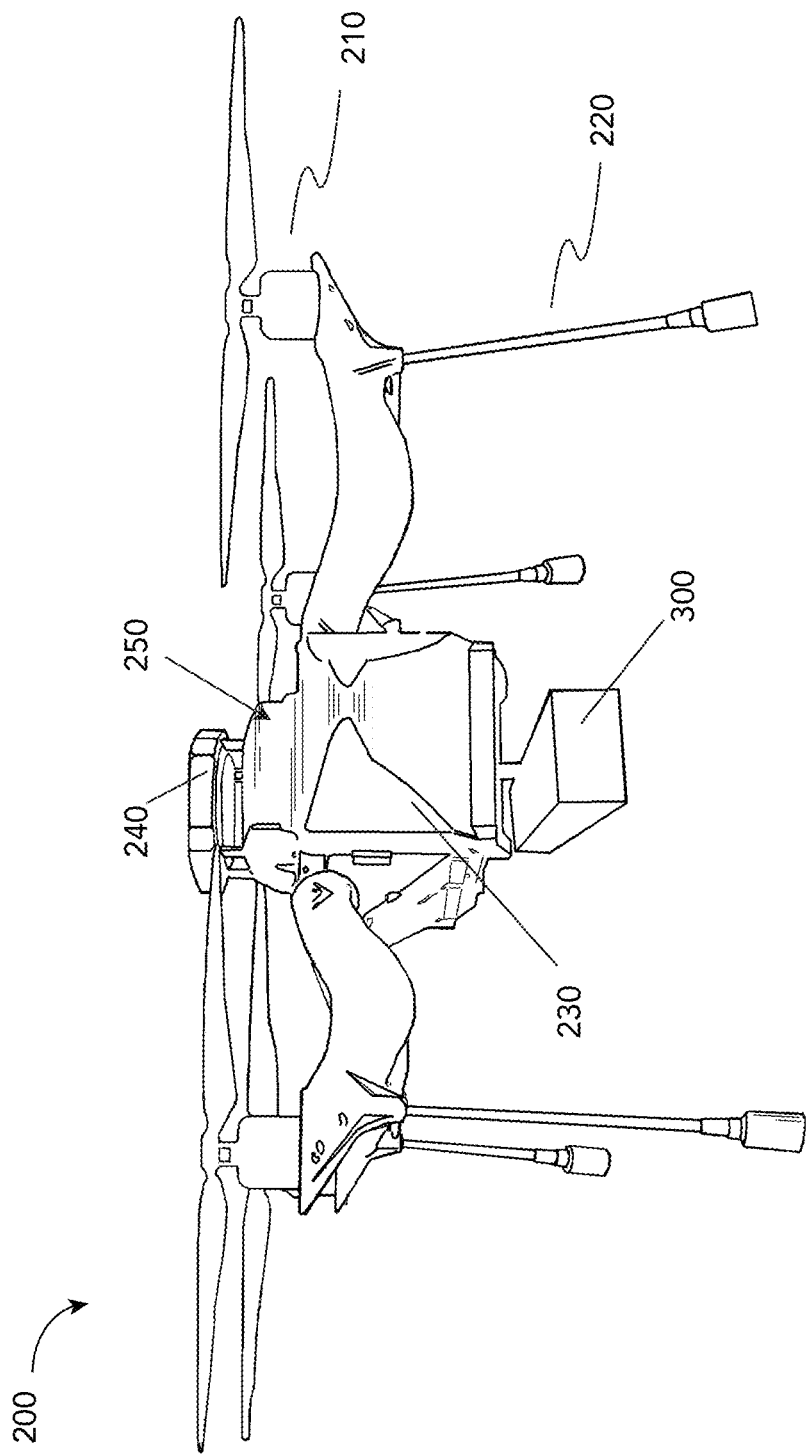
FIG. 2 is a drawing showing a perspective front view of an exemplary UAV and payload according to various embodiments of the present disclosure.
Figure 3:
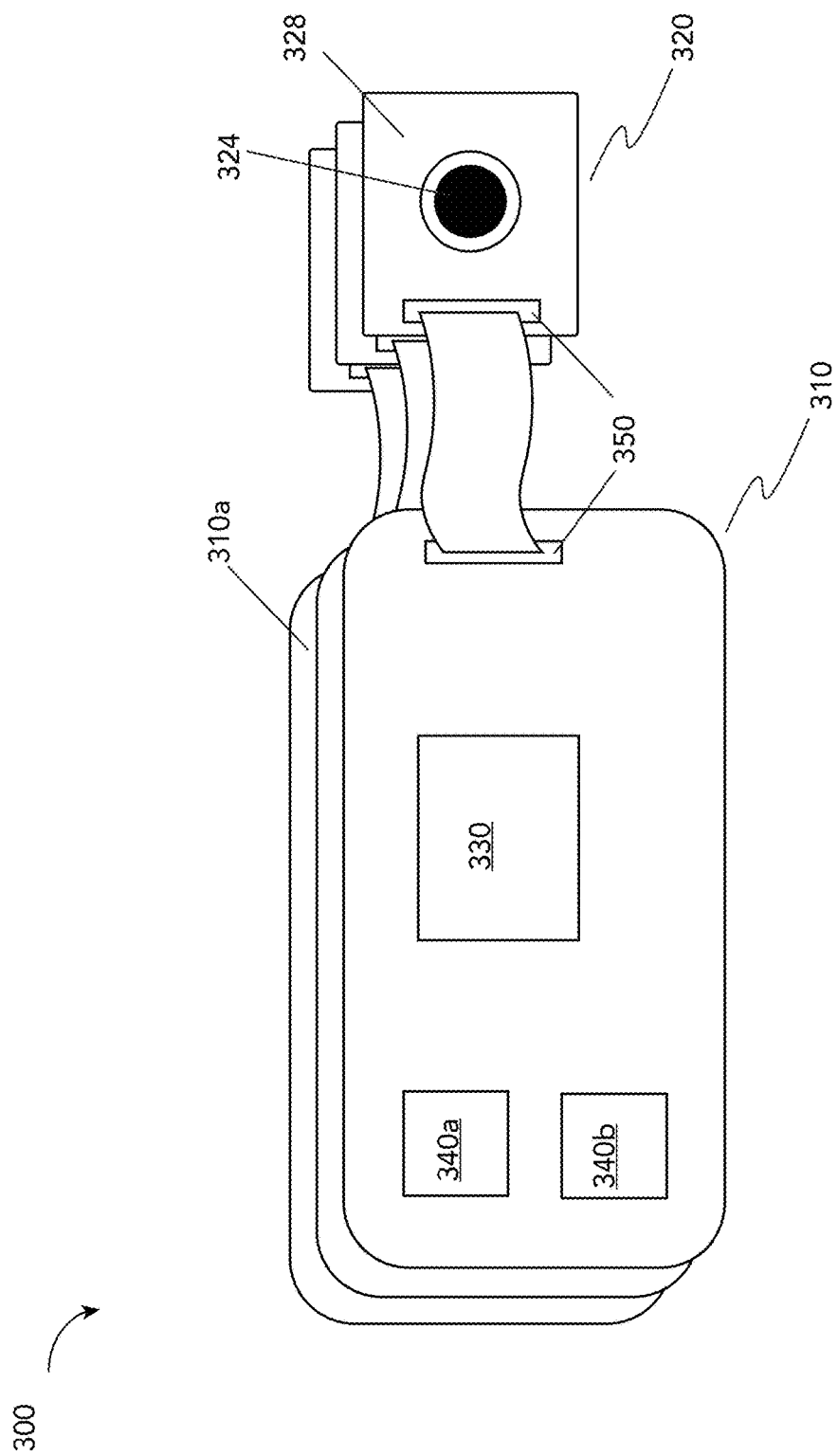
FIG. 3 is a diagram illustrating circuit board and camera modules of a representative camera payload according to various embodiments of the present disclosure.

FIGS. 2 & 3 illustrate one or more exemplary embodiments of a UAV and payload suitable for use in the systems and methods disclosed herein. As shown in FIG. 2, UAV 200 may comprise a quadcopter design having four motors/rotors 210, landing appendages (e.g. legs/boots) 220, a main body carriage 230, one or more GNSS modules 240, and one or more survey cameras 300. It should be appreciated that, as previously noted, other types and designs of UAVs may also be suitable for use in the systems and methods disclosed herein.

Body carriage 230 may house one or more components such as, e.g., power sources (e.g., batteries) (not shown) and a flight controller/autopilot module 250. Unless context suggests otherwise, as used herein the terms "flight controller" and "autopilot module" are used interchangeably. In general, autopilot module 250 contains sufficient hardware, data, and executable instructions to implement a flight management system. For example, autopilot module 250 may comprise one or more printed circuit boards supporting one or more processors, memory, code (including firmware), and storage, along with one or more hardware or software buses and I/O, to communicate with and manage auxiliary hardware and processes such as auxiliary processors (e.g., motor controllers, companion computers, payload controllers), sensors (e.g. IMU), and receivers (e.g., GNSS and telemetry modules). In one or more exemplary embodiments, autopilot 250 is of a type that supports the MAVLink and similar protocols.

In one or more exemplary embodiments, camera 300 may comprise one or more printed circuit boards 310 and one or more camera modules 320. Circuit board(s) 310 may support one or more processors 330, storage elements 340, and camera serial interfaces 350. In some embodiments, serial interfaces 350 comprise a CSI-2 or CSI-3 interface. In some embodiments, processors 330 may comprise a system on a chip (SoC) comprising a single or multi-core central processor (CPU) (e.g., an ARM-based processor) running an operating system (e.g. Linux), a single or multi-core graphics processor GPU (in some embodiments running a separate, RTOS), and memory (e.g., DRAM, SDRAM). In one or more embodiments, processor 330 has at least 128 Mb memory split between the CPU and GPU. In other exemplary embodiments, processor 330 has at least 512 Mb memory split between the CPU and GPU. In one or more embodiments, board 310 may comprise a Raspberry Pi (e.g., Raspberry Pi Zero W), and camera module 320 may comprise a Pi camera module. It should be noted, however, that any suitable controller and sensor module packages may be utilized and be within the scope of the embodiments described herein.

In one or more embodiments, camera 300 may comprise a plurality of boards 310 (previously described), and at least one of the boards 310a is configured to act as a companion computer to autopilot 250 and/or as a camera controller (e.g., to coordinate control of boards 310). For example, board 310a may be configured to be in serial or bus (or other suitable) communication with components supported by one or more of the other circuit board(s) 310. In one or more embodiments, the aforementioned components are situated in a camera housing (illustrated as camera 300 in FIG. 2).

In some embodiments, camera modules 320 may comprise fixed-lens optical sensors 324 mounted to sensor board 328, although in other embodiments sensors 324 may be mounted directly to circuit board 310. In one or more embodiments, optical sensors 324 may comprise at least 8 megapixel CCD or CMOS sensors capable of at least 3280×2464 pixel static images. In one or more embodiments, at least one of the fixed lens optical sensors is narrow-band filtered. In one or more embodiments, camera 300 comprises three camera modules 320, where one of the optical sensors 324 is an RGB sensor and two of the optical sensors are narrow-band filtered (a red bandpass filter and a blue bandpass filter) to have the following spectral characteristics: a) 543-558 nm, 653-668 nm, 835-865 nm, and (b) 468-483 nm, 543-558 nm, 835-865 nm. It should be noted that each triple-bandpass filter camera contains a green component (e.g., the 543-558 portion of the spectra) and a NIR component (e.g., the 835-865 portion of the spectra). The use of triple-bandpass filter cameras that each contain a green and/or NIR component allows for systems of the present disclosure that are capable of producing images from each of the triple-bandpass camera that contain enough information to calculate various vegetation indices using just the images from a single camera (one of the triple-bandpass camera), and thereby avoid pixel displacement inherent in utilizing pixels from images taken from different cameras, as is the case in current systems.

In general, camera storage elements 340 may comprise any storage sufficient to carry out the functionality of the systems and methods described herein. In one or more embodiments, camera storage 340 may comprise solid state storage. In some embodiments, camera storage 340 may comprise a primary storage 340*a* and a secondary storage 340*b*. In some exemplary embodiments, primary storage 340*a* comprises SD or micro-SD card storage and secondary storage 340*b* comprises USB-based storage (e.g., external hard disk, SSD, or USB stick). In one or more embodiments, primary storage 340*a* is a 32 GB micro-SD card and secondary storage 340*b* is a removable 32 GB USB stick.

In one or more embodiments, camera 300 is attached to main body carriage 230 via a 2-axis gimbal buffered with rubber vibration dampeners (not shown). In some embodiments, the gimbal contains two servo motors allowing movement along two degrees of freedom, where each servo allows a sweep of 60 degrees in a direction orthogonal to the other, and controlled by the flight controller on a millisecond basis. In one or more embodiments, the gimbal is itself mounted to the main body carriage 230 via anti-vibration rubber mounts (not shown).

In general, in the system and methods of the present disclosure, flight plan information (comprising, e.g., an ordered listing of waypoints and the flight altitude setting) may be generated as described below and uploaded to UAV 120/200. In one or more embodiments, the flight plan information is uploaded to companion computer 310*a* via a wireless connection (e.g., WiFi, Bluetooth) for use in executing a survey mission. Also generally, the UAV autopilot module (e.g., autopilot 250) may comprise the primary controller for executing the autonomous flight characteristics of the mission (e.g., navigating through waypoints and stabilizing the UAV), as generally known in the art. In some embodiments, after upload, all or a portion of the flight plan information (e.g., waypoints) is communicated by companion computer 310*a* to autopilot 250 for use in flying the mission specified by the flight plan.

Mission Planning

As previously noted, one issue for certain UAV users in building flight plans is lack of knowledge about the UAV hardware (e.g., drone and camera sensor), software and/or data requirements. Current options for building mission plans require a granular level of system knowledge and are too complex for most users and applications. This issue is even more pronounced when one considers building multiple, coordinated mission plans for surveying an area.

Mission planner aspects of the systems and methods of the present disclosure seek to minimize the need for a user to have granular system or application-specific information to build mission plans by enabling the user to build relatively simple or complex mission plans using only minimal user input. In one embodiment, in order to generate a mission plan—either a single mission plan or multiple, coordinated mission legs/sub-plans—the user need only provide information as to: (1) the area to be surveyed and (2) the items to be surveyed and/or the desired altitude of the survey flight. In other embodiments, the user may also input the desired level of image quality to be captured and/or the desired image overlap and sidelap. In one non-limiting example of a suitable application for the UAV systems described herein, a crop grower may survey and collect image data of one or more fields for use in stitching together one or more mosaics and generating reports directed to metrics such as, e.g., crop counts, NDVI, irrigation levels, weed presence, and/or pests, etc. In other non-limiting examples of suitable applications, a user may wish to survey/overfly an area in connection with spraying, e.g., pesticides or herbicides, or spreading, e.g., seeds.

Figure 4:
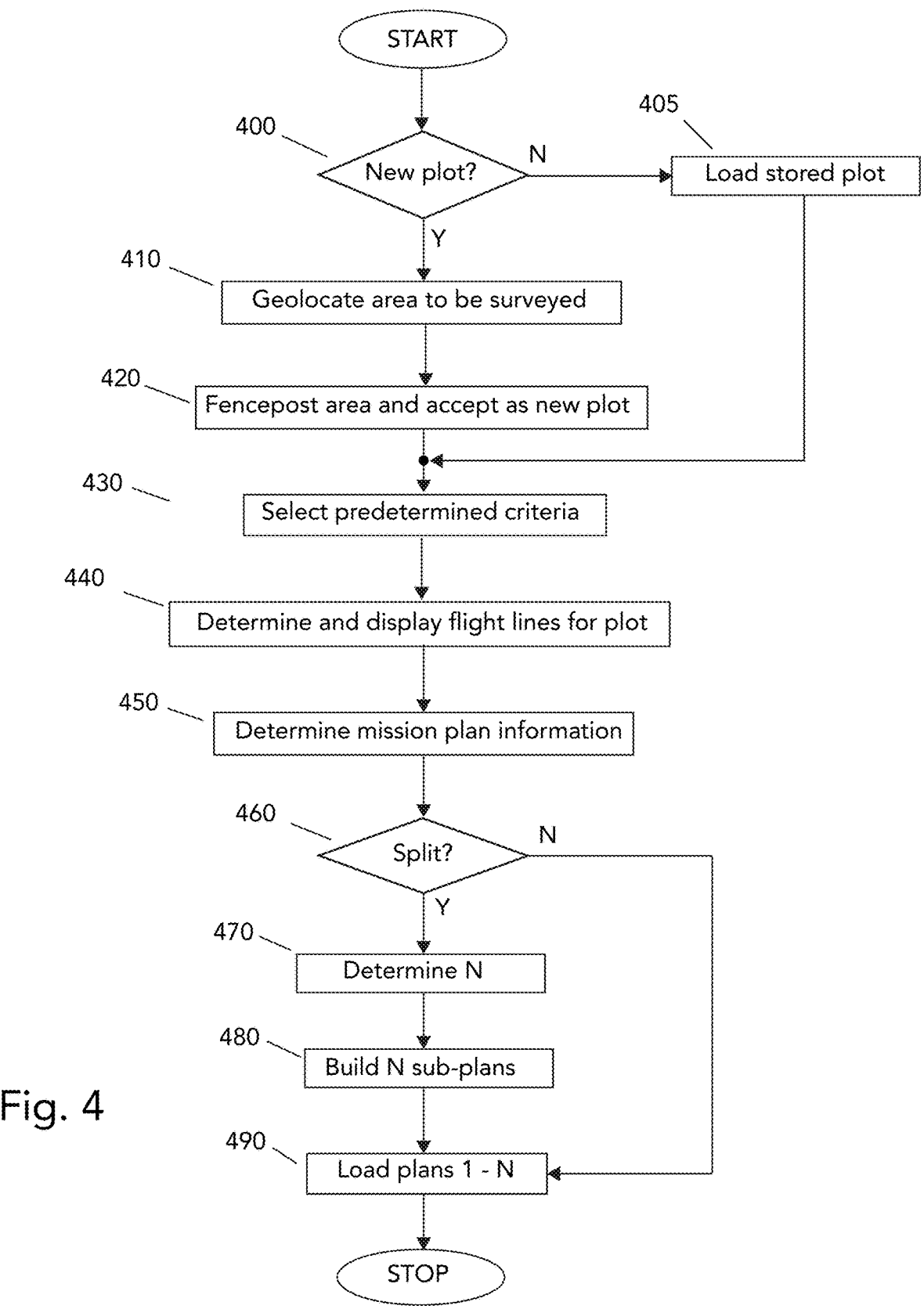
FIG. 4 is a flowchart illustrating a general method for generating a flight plan according to various embodiments of the present disclosure.

One or more embodiments of the mission-planning system and methods disclosed herein are described further with reference to FIGS. 4-9. FIG. 4 illustrates exemplary method steps, while FIGS. 5-7 and 9 illustrate exemplary user interfaces of the system and methods of the present disclosure. Utilizing the system, at step 400 device 130 prompts a user (not shown) to indicate whether the user is interested in creating a new survey plot or whether the user wishes to load a previously stored plot. The system may, for example, display a user interface (not shown) or a widget or other control portion of a user interface that provides a user the options of either loading a stored plot or creating a new plot.

Figure 5:
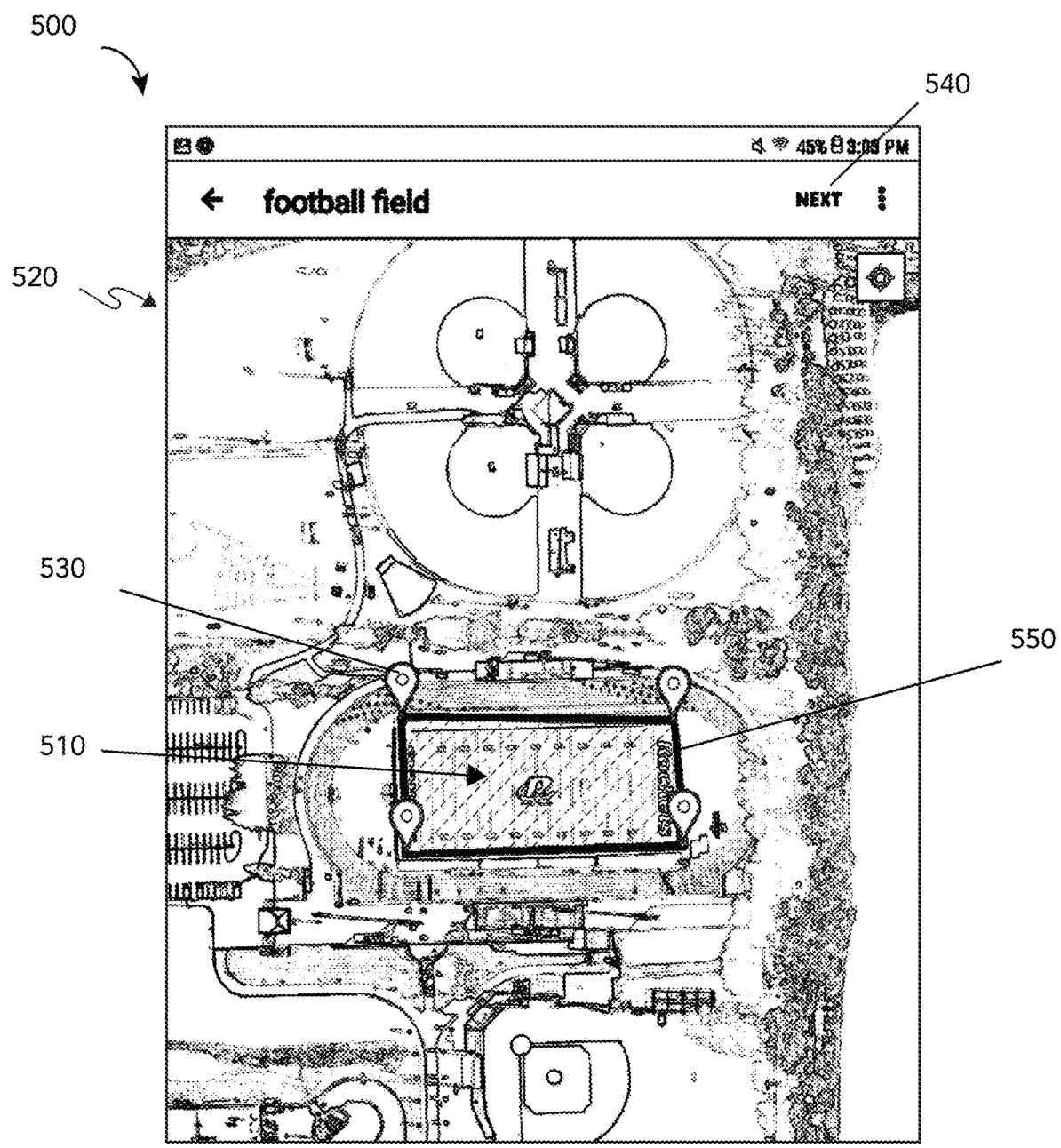
FIG. 5 is a diagram illustrating an exemplary user interface comprising certain functionality according to various embodiments of the present disclosure.

If the user wishes to create a new survey plot, at step 210 the system enables the user to geolocate the area to be surveyed and at step 220 enables the user to demarcate or fencepost the area—e.g., a crop field or fields—as described in more detail in relation to FIG. 5. FIG. 5 show an exemplary user interface 500 that allows a user to geolocate to the new area to be surveyed (in the example shown, a football field). User interface 500 includes map portion 520. In some embodiments, map portion 520 shows a satellite image, while other embodiments may use other map types (e.g., roadmap, hybrid map types). Map portion 520 allows the user to interact with it to geolocate the area to be surveyed. Any suitable map/geolocation services or API may be utilized to provide the map and geolocation capability, including for example, Google Maps®, TomTom®, Mapbox®, Leaflet, etc.

Using user interface 500, a user navigates to a local geographic area that includes the area to be surveyed and fenceposts the survey plot, illustrated in FIG. 5 by plot 510. In this embodiment, fence-posting is accomplished on user interface 500 by interacting with the user interface to drop fencepost markers 530 to demarcate the area to be surveyed. In this example, four markers 530 have been dropped to demarcate a plot (plot 510) that is approximately rectangular in shape; however, any number of markers may be utilized to demarcate a survey plot area that takes any polygonal shape. The system calculates the polygonal shape of the area fence-posted and displays a visual indication of the shape by, for example, providing a shaded overlay to indicate the polygon that has been fence-posted by the user. The user determines if the visual indicator accurately represents the desired survey plot. If not, the user may resize and/or reconfigure the shape of the area to be surveyed by adding/deleting/moving fencepost markers 530. The system automatically recalculates and displays the new, corresponding polygonal shape. Once the user is satisfied that the desired area has been fence-posted, the user may save the area as a new plot. In the example shown in FIG. 5, the user may save the plot by using control element 540 to advance to the next screen (not shown), at which point the system may prompt the user to name the plot. Here, the user has named plot 510, "football field", as indicated in the title bar on user interface 500.

At step 420, the user configures a mission plan for the plot (e.g., plot 510) by selecting values for one or more predetermined criteria settings, wherein at least one of the predetermined criteria is application specific. In one embodiment, the mission plan is configured by a user setting just one predetermined criteria, while in other embodiments additional predetermined criteria (e.g. image overlapping, flight speed) may be set by a user. In one embodiment, the predetermined criteria to be set by a user may comprise a crop-type setting, wherein the crop-type setting is application specific. In other embodiments, the predetermined criteria may also include an image quality setting. In other embodiments that are directed to different end-user applications, such as, e.g., counting of livestock or monitoring of construction projects, different application-specific type predetermined criteria may be utilized.

Figure 6A:
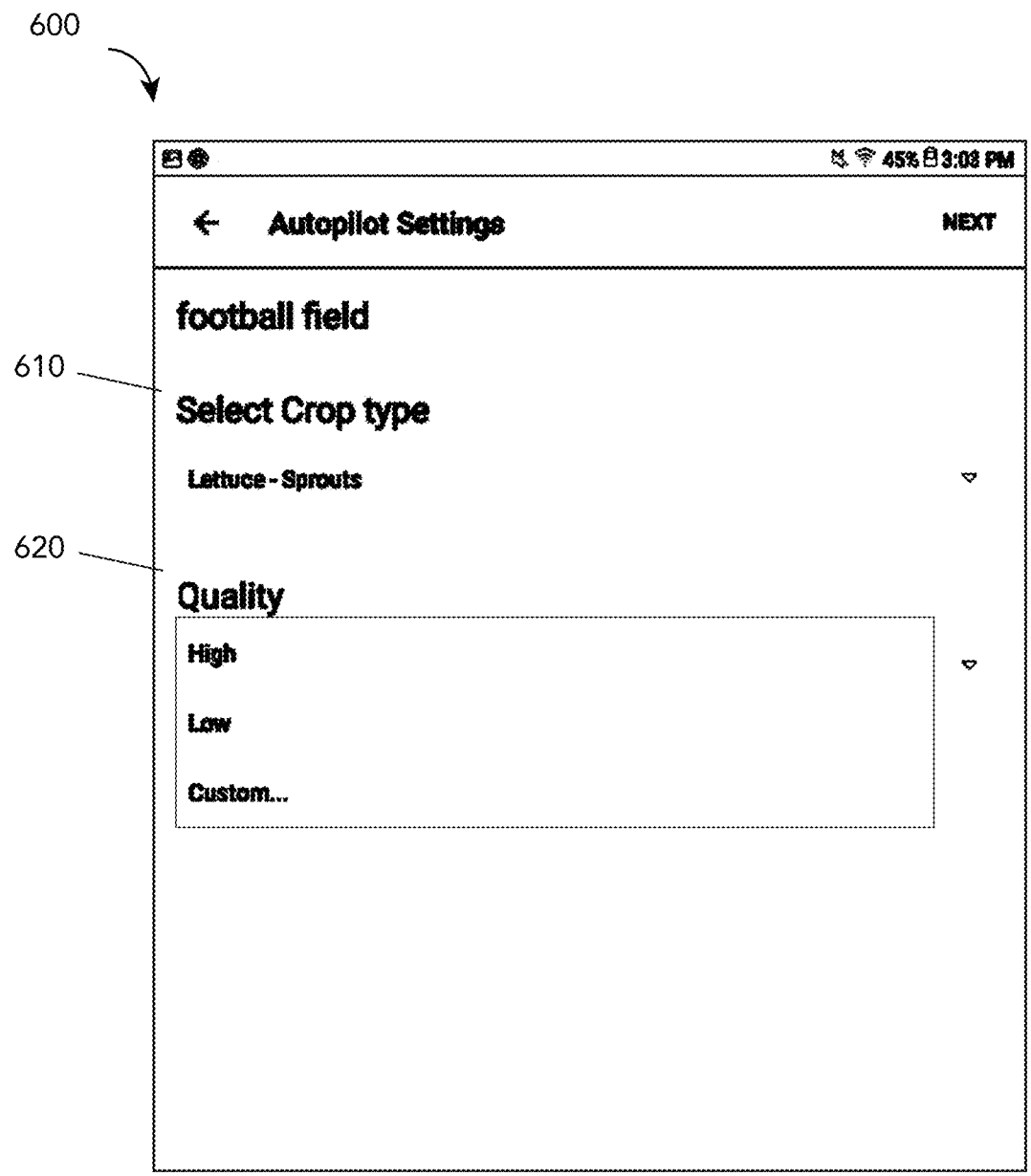
FIG. 6A is a diagram illustrating an exemplary user interface comprising certain functionality according to various embodiments of the present disclosure.
Figure 6B:
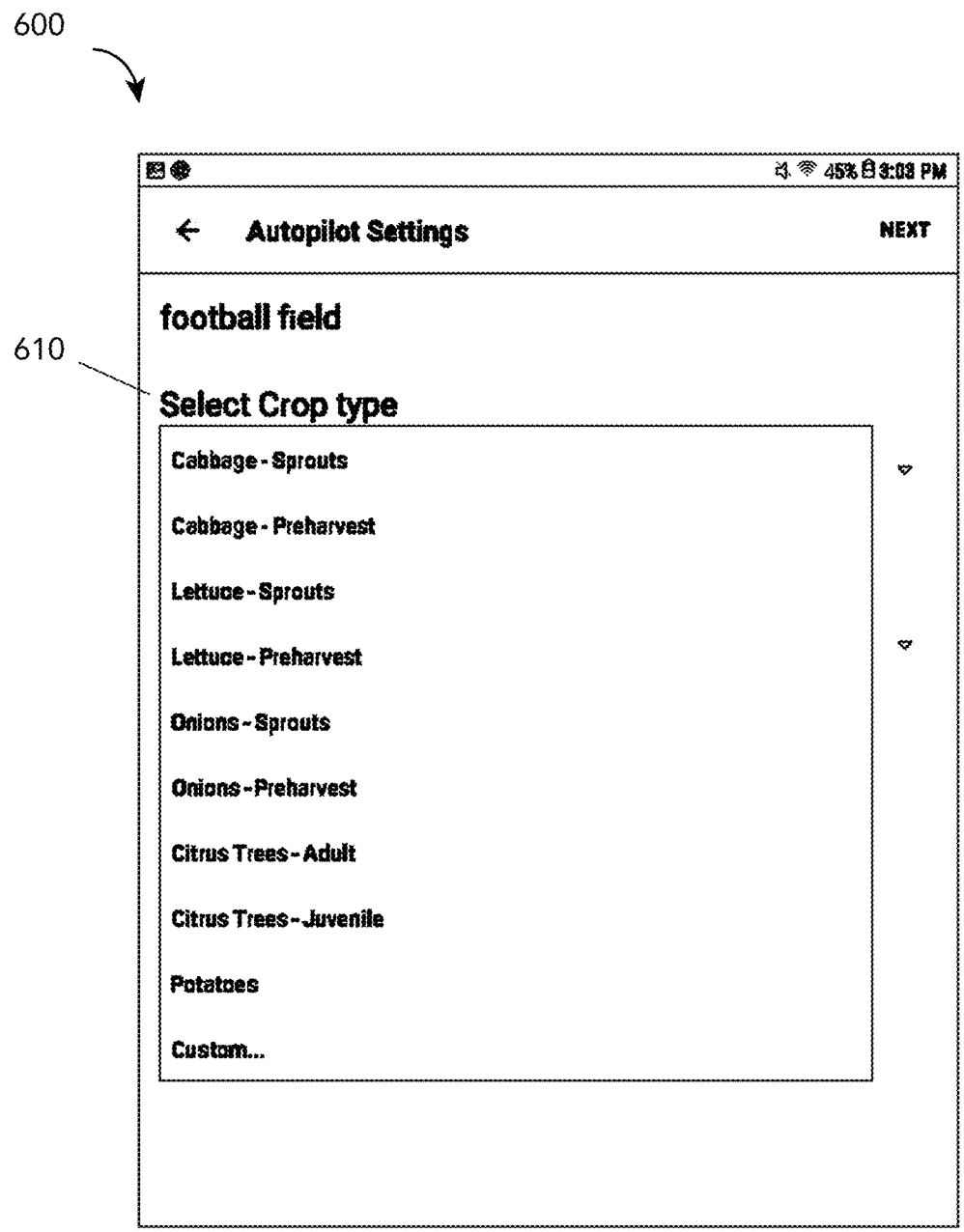
FIG. 6B is a diagram illustrating an exemplary user interface comprising certain functionality according to various embodiments of the present disclosure.

With reference to FIGS. 6A&B, an exemplary user interface 600 is shown that allows a user to choose a value for pre-configured settings for both crop-type and image quality using control elements 610 and 620, respectively.

The application specific crop-type setting 610 correlates to pre-configured height/altitude settings (which terms are used interchangeably herein unless context suggests otherwise) for the UAV's flight path, wherein the height/altitude settings have been optimized for surveying plots and obtaining data with respect to different types of crops and/or crop structures or artifacts (e.g., sprout, seedling, mature plant, etc.). In one exemplary embodiment, the following crop-type settings correlate to a height (meters) configured to be a value within the following ranges:

TABLE 1

| | |
|---|---|
| Cabbage - Sprouts | 16-121 |
| Cabbage - Preharvest | 44-121 |
| Lettuce - Sprouts | 16-121 |
| Lettuce - Preharvest | 44-121 |
| Onions - Sprouts | 22-121 |
| Onions - Preharvest | 33-121 |
| Citrus Trees - Adult | 110-134 |
| Citrus Trees - Juvenile | 50-121 |
| Potatoes | 44-121 |

In another exemplary embodiment, the following crop-type settings correlate to a height (meters) configured to be set at the following:

TABLE 2

| | |
|---|---|
| Cabbage - Sprouts | 16-20 |
| Cabbage - Preharvest | 44-53 |
| Lettuce - Sprouts | 16-20 |
| Lettuce - Preharvest | 44-53 |
| Onions - Sprouts | 22-26 |
| Onions - Preharvest | 33-41 |
| Citrus Trees - Adult | 110-134 |
| Citrus Trees - Juvenile | 50-60 |
| Potatoes | 44-53 |

In another exemplary embodiment, the following crop-type settings correlate to a height (meters) configured to be set at the following:

TABLE 3

| | |
|---|---|
| Cabbage - Sprouts | 18 |
| Cabbage - Preharvest | 49 |
| Lettuce - Sprouts | 18 |
| Lettuce - Preharvest | 49 |
| Onions - Sprouts | 24 |
| Onions - Preharvest | 37 |
| Citrus Trees - Adult | 121 |
| Citrus Trees - Juvenile | 55 |
| Potatoes | 49 |

It should be understood that the embodiments of this disclosure are not intended to be limited to these particular crop-type settings and correlated heights; any optimized height may be correlated with a setting directed to a particular crop and/or other observed structures in various embodiments described herein. It should also be understood that different application-specific criteria may be utilized for configuring the mission planning system of the present embodiments, depending on the surveying application. For example, in a spraying (pesticide or herbicide) survey/overfly application, a different height correlation may be utilized. Note that, in one or more embodiments of the system and method disclosed herein, the height/altitude setting may be set by a user directly, and in such embodiments the user interface allows for a user to input the height/altitude parameter directly—whether by drop down selection or by direct entry of a value.

In those embodiments that allow users to set a second criteria (e.g., an image quality criteria), the image quality setting 620 may correlate to pre-configured image overlap and image sidelap settings. In general, image overlap refers to the amount of overlap (typically represented as percentage of the imaged area) present in a captured image when compared to the image captured immediately prior to it, as measured in the direction along the line of flight (for the sake of reference, characterized herein as the "y" axis). Similarly, image sidelap generally refers to the amount of overlap present in images captured along a line of flight when compared to images captured in the line of flight immediately prior to it (e.g., as measured in the direction that is perpendicular (and planar) to the current line of flight—for the sake of reference, characterized herein as the "x" axis). Note that as used herein, the terms "overlap" and "overlapping" may refer generally to image overlap, as previously described, as well as image sidelap, unless context suggests it is used in the narrow sense previously described (i.e., as measured along the line of flight).

In general, for image-capture applications, increasing the amount of required overlap and sidelap present in survey images results in the UAV needing to capture and store a greater number of survey images to cover the plot. A tradeoff in having to capture and store increased numbers of survey images, however, results from the fact that more data exists for the user to stitch together higher quality mosaics of the plot. It should be appreciated that some embodiments within the scope of the present disclosure do not allow for the user to set the image overlapping (in such embodiments the overlapping is a pre-set parameter in the UAV software), while in others a user may set the overlapping directly (e.g., by drop down selection or by typing in the value), rather than as an image quality criteria selection. It should also be appreciated that in applications other than imaging applications (e.g., in spraying applications), different considerations may be present for setting the overlap/sidelap setting—for example, overlap in such applications may refer to a characteristic distance tied to crop or row spacing. Unless context suggests otherwise, however, the terms overlap, overlapping, and sidelap refer to the meanings connoted by an imaging survey application.

Other relevant parameters for the system may be preconfigured in the UAV software and/or in the mission planning application by a superuser or other administrative-type user, such that the casual user of the systems and methods herein (e.g., a farmer or UAV pilot) need not separately configure or set them. Generally, such preconfigured parameters may optionally include, but are not necessarily limited to: minimum "shutter" interval (a time delay between image captures in a digital camera, usually expressed in seconds), optical sensor dimensions x and y (sensor width and height, respectively), and camera focal length. In some embodiments, the optical sensor dimensions x and y, focal length, and camera minimum shutter interval for camera 120a may generally be any settings sufficient to provide the functionality described herein. In some embodiments, camera 120a minimum shutter interval may generally be set from about 0.5 to about 9 seconds; in others, from about 0.9 to about 5.0 seconds; in others, from about 1.5 to about 3.5; in others, the minimum shutter interval may be set to about 2.5 seconds. In one or more exemplary embodiments, sensor dimensions (diagonal, mm) may generally be from about 4.6 (e.g., 3.68×2.76 mm) to about 27.8 (e.g., 23.2×15.4 mm); in others from about 4.6 (e.g., 3.68×2.76 mm) to about 7.6 (e.g., 6.17×4.55 mm); in others, the dimension may be about 4.6 (3.68×2.76 mm). In some embodiments, camera 120a focal length (in mm) may generally be from 0.5 to 12.0; in others, from 0.8 to 5.0; in others, from 2.8 to 3.6; in other, the focal length may be 3.0.

At step 440 the system determines the flight lines for the survey over plot 510 and displays the flight lines on the user interface for the user to inspect and approve. In determining the flight lines, the system may utilize a characteristic length between flight lines, the "grid interval," that may be calculated for imaging applications using the following:

$$\text{grid interval}=(100.0-\text{Sidelap})/100.0*\text{shootingRange}X \quad (1)$$

$$\text{shootingRange}X=\text{Height}*\text{imageSensor}X/\text{focusLength} \quad (2)$$

where imageSensorX is optical sensor 120a width (dimension in the x direction), focusLength is camera 120a focal length, Sidelap is the amount of sidelap parameter, and Height is the characteristic altitude parameter. In one or more embodiments, the Sidelap parameter is preconfigured to be a value between 60-90%; in other embodiments, between 70-80%; in still other embodiments, the Sidelap is set to 80%. In some embodiments, Sidelap is the sidelap setting set by the user indirectly via the image quality user setting (via control element 620), while in other embodiments it is a preset parameter. In some embodiments, Height is the characteristic altitude set by the user indirectly via an application-specific setting (e.g., the crop-type user setting, via control element 610), while in other embodiments the user may set the Height directly. Note that in non-imaging applications such as, e.g., spraying applications, a different grid interval setting may be employed that takes into consideration application-specific considerations such as, e.g., row width and spacing.

Continuing with step 440, the system may initially store the plot boundary (indicated in FIG. 5 by border 550) as a listing (e.g., string, List) of waypoints. Any suitable format may be utilized. For example, in some embodiments waypoints may be stored as a Java (or other language) List of latitude & longitude coordinate values (and in some cases altitude values too), while in others the waypoints may be stored as key-value pairs, in which the value is an indicator of latitude and longitude coordinates. By convention, the first waypoint in the boundary list may be set to the northwesterly-most waypoint, but other conventions may be utilized in different embodiments (e.g., the southwesterly-most waypoint). Again by convention, the system may choose to store as the second waypoint in the boundary list the southwesterly-most waypoint, although other conventions may be utilized in different embodiments (e.g., the northwesterly-most waypoint). Using the first and second boundary waypoints, the system determines a characteristic heading angle, as measured from a predetermined axis, such as the North/South axis, although in other embodiments a different manner of choosing a characteristic heading angle may be utilized.

Continuing still with step 440, the system determines the flight lines that traverse the plot 510 along the same heading angle and/or the opposing angle (i.e., the heading angle plus 180 degrees). It is noted that the heading of the flight lines alternate between the heading angle and the opposing angle, indicative of the direction that the UAV is to traverse the plot. Also, it is noted that the system spaces each flight line from each adjacent flight line by the characteristic grid interval. Finally, it is noted that the system determines a "stepping" flight line between each adjacent flight line at the end in which the UAV changes its heading—as it changes its traversal direction—and the flight line heading for each stepping flight line is set to be at 90 degrees difference from the preceding traversal flight line.

Continuing still with step 440, after having determined the flight lines, the system may "clip" the flight lines to the plot boundary, by specifying each point of intersection between a flight line and the boundary as a waypoint, such that each of such modified flight lines is specified by two waypoints—one for each end—that mark the plot boundary at the given flight line. Note that each of the identified boundary waypoints is included in an ordered list, such that the ordered list of "clipped" (boundary intersection) waypoints, referenced herein as a flight path waypoints, specifies a flight path crisscrossing the plot.

Figure 7:
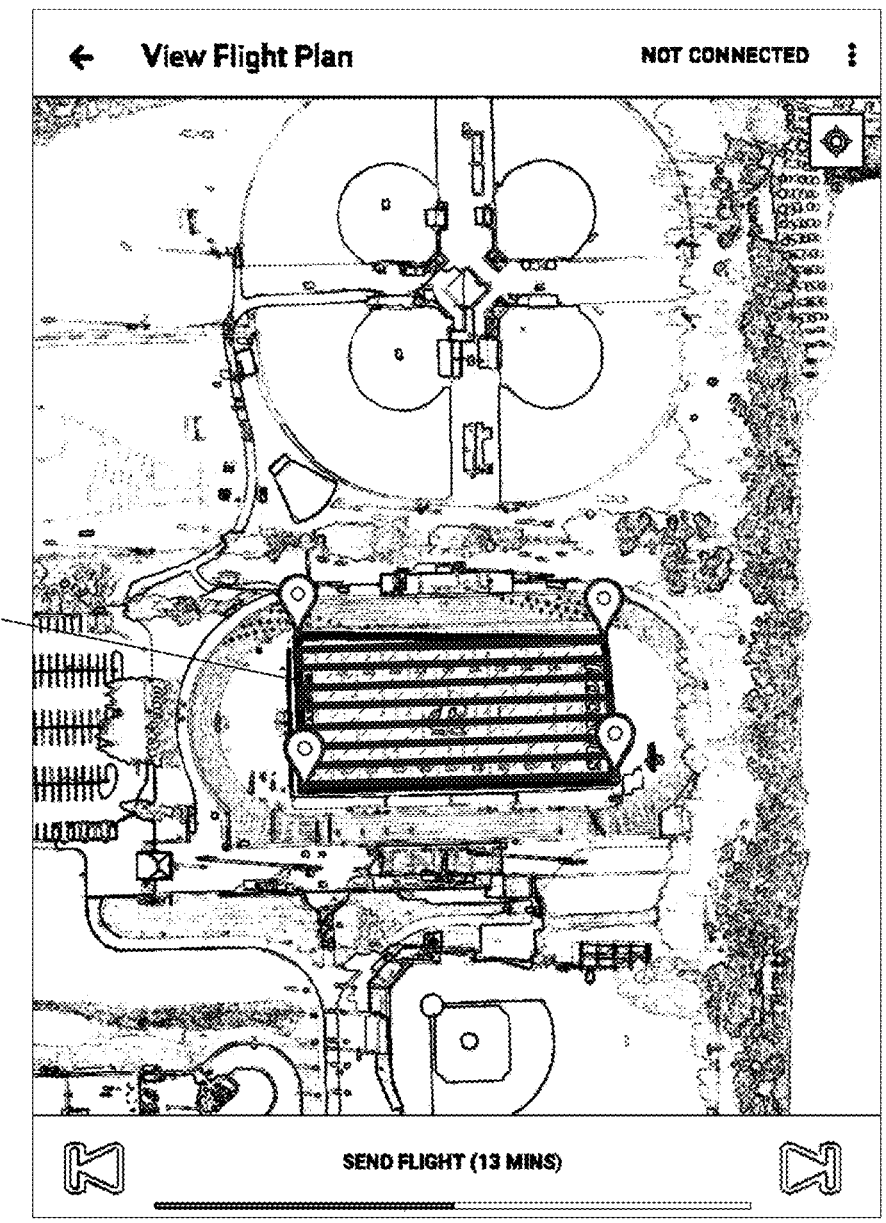
FIG. 7 is a diagram illustrating an exemplary user interface comprising certain functionality according to various embodiments of the present disclosure.

Continuing still with step 440, the system displays the flight lines as an overlay onto plot 510, as illustrated by lines 720 in FIG. 7. Note that if the flight lines are not to the user's liking, the system provides a control element (not shown) that allows the user to have the system recalculate the flight lines using an alternative heading angle. In some embodiments, the alternative heading angle is the original heading angle plus 90 degrees.

Figure 8:
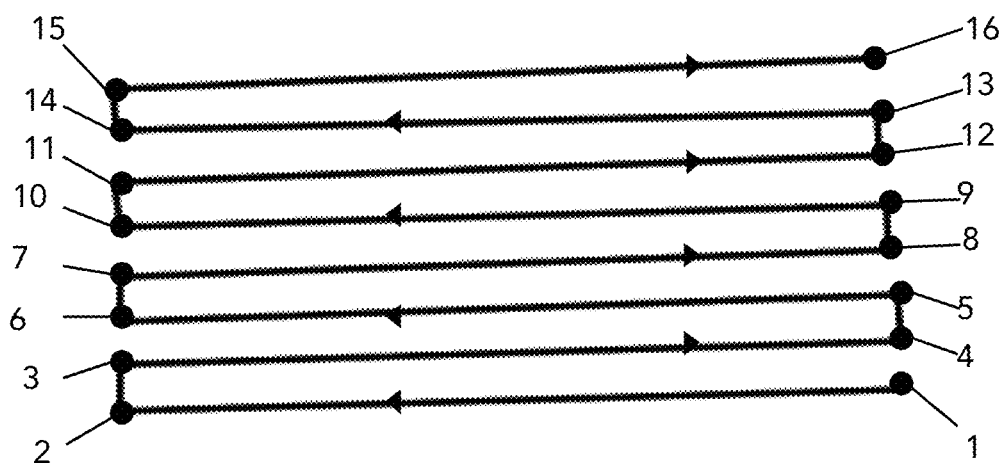
FIG. 8 is a line drawing illustrating the exemplary flight path shown in FIG. 7 and according to various embodiments, having waypoints marked.
Figure 9:
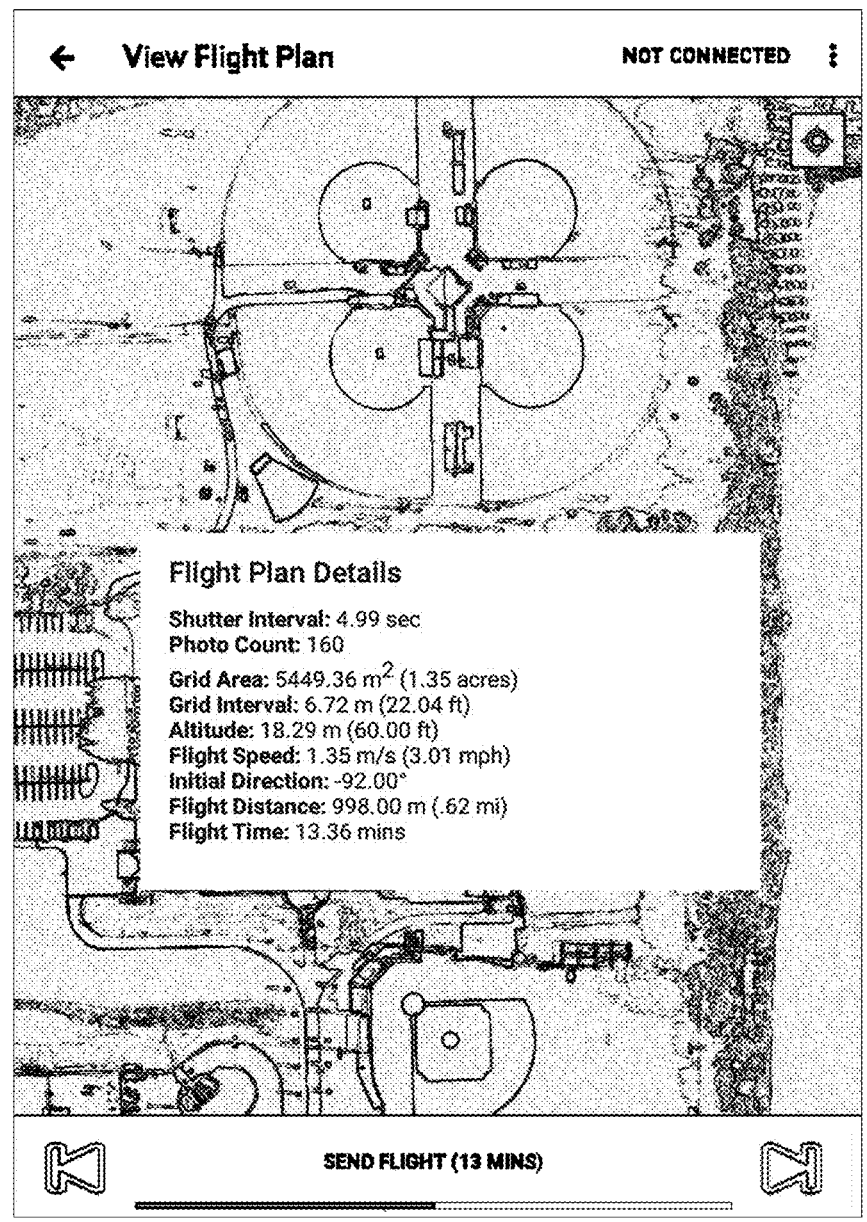
FIG. 9 is a diagram illustrating an exemplary user interface comprising certain functionality according to various embodiments of the present disclosure.

FIG. 8 shows a schematic illustration of the flight path determined in step 440 and displayed onto user interface 500 in FIG. 7. The flight path waypoints are shown as an ordered set labelled 1-16. The system of the present embodiments may store the flight path waypoints (and any other flight path information) in any suitable manner. In some embodiments, the system stores flight path waypoints as an ordered list of latitude and longitude values (or, in some embodiments latitude, longitude and altitude values).

At step 450, the system determines and stores additional mission plan information. In one or more embodiments, the system calculates the total distance, D, of the flight lines determined in step 440. In some embodiments, the total distance is utilized to calculate a flight time estimate by dividing the total distance by the characteristic speed of the mission (e.g., a manually set speed or the baseSpeed parameter, described below). In some embodiments, additional and/or different time components may be added to the estimate, such as the time taken to fly to/from the home waypoint, and a time lag estimate for the UAV to dwell at each waypoint, such as, e.g., a 3 second time lag. In one or more embodiments, a user interface may be provided showing mission plan information and/or relevant preconfigured or calculated mission-related information, such as user interface 900 shown in FIG. 9.

In one or more embodiments, at step 450 a characteristic distance in the direction of the flight path, referred to herein, in relation to certain imaging applications, as the Shutter Distance, is determined by the system. In some embodiments, the Shutter Distance is calculated as follows:

$$\text{ShutterDistance}=(100.0-\text{Overlap})/100.0*\text{shootingRange}Y \quad (3)$$

where $$\text{shootingRange}Y=\text{Height}*\text{imageSensor}Y/\text{focusLength} \quad (4)$$

and where imageSensorY is optical sensor 120a length (dimension in the y direction), focusLength is camera 120a focal length, Overlap is the amount of overlap parameter, and Height is the characteristic altitude parameter. In one or more embodiments, the Overlap parameter is preconfigured to be a value between 60-90%; in other embodiments, between 70-80%; in still other embodiments, the Overlap is set to 80%. In some embodiments, Overlap is the overlap setting set by the user indirectly via the image quality user setting (via control element 620), while in other embodiments it is a preset parameter. In some embodiments, Height is the characteristic altitude set by the user indirectly via an application-specific setting (e.g., the crop-type user setting, via control element 610), while in other embodiments the user may set the Height directly. Note that in non-imaging applications such as, e.g., spraying applications, a different overlap and characteristic distance setting may be employed that takes into consideration application-specific considerations such as, e.g., crop size and spacing.

In some embodiments, the system calculates a default or base speed ceiling using a preconfigured minimum camera shutter interval, referred to herein as the minimumShutterinterval, and utilizing the following relationship:

$$baseSpeed = ShutterDistance/minimumShutterinterval = (100.0 - Overlap)/100.0 * shootingRangeY/minimumShutterinterval \quad (5)$$

In other embodiments, the UAV speed is set directly as a configured parameter. As described in more detail below, in one or more embodiments the UAV flight controller and/or the camera payload controller may utilize one or more of the calculated Shutter Distance and baseSpeed parameters as part of the uploaded mission plan information to execute a mission.

At step 460, the system evaluates whether the flight plan is such that it should be split into multiple legs or sub-plans (as used herein, the term "leg" and "sub-plan" may be used interchangeably unless context suggest otherwise). In some preferred embodiments, the evaluation may be based on comparing the total calculated flight time needed to overfly the entire area, $T_{Area}$, by the maximum authorized drone flight time, Z (the amount of time determined to be the maximum amount of time the drone should be flying a mission before returning to ground). Note that in some embodiments, Z may be a preconfigured based on factors such as, e.g., battery performance, safety factors (e.g., minimum battery charge). In other embodiments, Z may be calculated by the system or input by a pilot at the time of flight based on factors such as, e.g., battery performance, wind speed, safety factors, etc. If $T_{Area}$ exceeds the maximum authorized drone flight time, Z, the system divides the flight plan into a plurality of ordered sub-plans, N.

In other embodiments, the evaluation may be based on the total number of images that are required to be captured to span the fenceposted area, R. In one or more embodiments, R is calculated by dividing the total distance, D, by the ShutterDistance. In one or more embodiments, there is a preconfigured maximum authorized number of captured images parameter, Z', that is set in the system corresponding to any sub-plan. Z' may be determined based on one or more suitable factors such as, e.g., camera storage space and/or battery performance. If the required number of images for a flight path, R, exceeds the maximum authorized number, Z', the system divides the flight plan into a plurality of ordered sub-plans, N. Note that in other embodiments, a different evaluation and criteria may be employed by the system to determine whether the mission plan should be split into multiple sub-plans, including using the characteristic distance setting to determine a number of units present in the flight path, and comparing that number with a maximum unit setting for making the determination (as, for example, in non-imaging applications).

At step 470, in one or more preferred embodiments, the number of required sub-plans N may be determined by dividing the required total flight time, $T_{Area}$, by the maximum authorized drone flight time, Z, and rounding up to the next whole number. In other embodiments, the number of required sub-plans N may be determined by dividing the required number of images, R, by the maximum authorized number of captured images parameter, Z', and rounding up to the next whole number. As may be appreciated, for other embodiments the number of images, R, may be replaced by a representative number of distance units parameter, and the number Z' may be replaced by a maximum unit setting for each sub-plan (as in, for example, non-surveying applications).

At step 480, in one or more embodiments, each sub-plan is tagged with a sequence number, S, wherein S is a whole number between 1-N, and the flight path waypoints determined above at step 440 are allocated to a particular sub-plan based on the sequence number such that the first set of flight path waypoints are allocated to the first sub-plan, and the next set of flight path waypoints are allocated to the next sub-plan in the sequence, and so on. Accordingly, in one example, the first flight path waypoint that is allocated to the second sequenced sub-plan (i.e., the sub-plan where S=2) is the last flight plan waypoint in the first sequenced sub-plan. The allocation is continued in this manner until the total number of flight path waypoints determined in step 440 have been allocated among the N sub-plans.

In one or more alternate embodiments, the allocation of waypoints to a plurality of sub-plans is determined in other manners. For example, the allocation may be based on achieving an even allocation in the number of waypoints per sub-plan. Other examples may include allocating waypoints in a manner that takes into consideration the shape of the surveyed plot and that seeks to achieve simple geometry in the shape (e.g. rectangular or square) of each sub-plan. For example, in one alternate embodiment, upon determining that the number of images exceeds the threshold value set for splitting the plan into sub-plans (e.g., Z'), the system may recalculate the flight lines to achieve sub-plans that each (1) have relatively simple geometry (e.g., approximately square shape) and (2) do not result in number of pictures that exceeds Z'. In one embodiment, this may be achieved by fenceposting a mask of geometrically-simple shapes over the plot and clipping the original flight lines to the mask, arriving at new sets of waypoints.

At step 490, the user loads mission plan information to one or more UAVs in order to fly the overall survey mission for the plot. In one or more embodiments, mission plan information to be loaded includes at least the flight path waypoints. In some embodiments, mission plan information to be loaded may also include a home location and initial heading. In still other embodiments, mission plan information may also include minimum shutter interval (e.g., minimumShutterinterval) and the characteristic shutter distance (e.g. ShutterDistance). In one or more embodiments, the mission plan information that is loaded comprises mission plan information directed to one or more of the sequenced sub-plans, comprising at least the sequenced sub-set of flight path waypoints determined for the plot in one of the manners previously described.

In one or more embodiments, a UAV pilot (not shown) may utilize the system and methods disclosed herein to fly and survey a relatively large plot using a single UAV by determining a sequenced set of mission legs/sub-plans for the plot and loading and flying each leg in sequence using the single UAV. Alternatively, each of the sequenced legs/sub-plans may be loaded onto multiple UAVs and flown over the plot at the same time.

Once the flight plan or plans is loaded onto the UAV(s), a pilot user initiates the takeoff and the UAV navigates the waypoints and the system, including the camera payload, executes the surveying routines, as described in more detail below.

Image Capture-Time Based

In general, in some embodiments, the image capture method performed by camera 120a/300 may be based on a time-delay image capture loop, wherein a static image is captured by each board 310 after each elapse of a characteristic time delay, T, until a certain number of images ($N_{PICS}$) have been captured. In one or more embodiments, each camera board 310 executes the same or similar time-delay image capture method, while in others, the companion computer 310a executes a method with more functionality (e.g., logging, parameter calculations, communications handling) than time-delay image capture methods executed on the other camera boards 310, as described in more detail below. In some embodiments, the image capture method is written in Python script, although any suitable language may be used.

In some embodiments, T is a preconfigured parameter setting. For example, in one or more embodiments, the image capture method uses a T setting in the range (in seconds) between about 0.5 to about 9.0; in other from about 0.9 to about 5.0; in others, from about 1.5 to about 3.5; in others, T is set to 2.5. In other embodiments, the characteristic time delay, T, is calculated by companion computer 310a as follows:

$$T = D_{image}/S \tag{6}$$

Where $D_{image}$ refers to a characteristic distance between each image and S refers to the flight speed of UAV 120/200.

In some embodiments, $D_{image}$ is the ShutterDistance value, calculated as previously noted by device 130 and uploaded to camera 120a/300 as part of the flight plan information. In other embodiments, $D_{image}$ is determined by companion computer 310a. In one or more embodiments, the calculation is as follows:

$$D_{image} = (100 - \text{Overlap})/100.0 * \text{shootingRange}Y \tag{7}$$

where $$\text{shootingRange}Y = \text{Height} * \text{imageSensor}Y/\text{focusLength} \tag{8}$$

and where imageSensorY is the length (dimension in the y direction) of the sensor (e.g., CCD or CMOS sensor) of the relevant fixed-lens optical sensor 324, focusLength is focal length of the relevant fixed-lens optical sensor 324, Overlap is the amount of overlap desired, and Height is the characteristic altitude set by the user directly or indirectly, as previously noted, via an application-specific setting (e.g., the crop-type user setting in the mission planning application, via control element 610) and uploaded as part of flight plan information. In one or more embodiments, the Overlap setting is pre-configured, while in other embodiments it is set by a user indirectly, as previously noted, via the image quality user setting (via control element 620) of the mission planning application and uploaded as part of flight plan information. Some exemplary values for imageSensorY, focusLength, and Overlap are as previously noted in relation to the mission planning application.

In some embodiments, S may be the baseSpeed calculated by the mission planning application on device 130 as previously noted and uploaded to camera 300 as part of the flight plan information. In other embodiments, S may be calculated by companion computer 310a using the baseSpeed formula previously noted in relation to the mobile planning application, using uploaded flight plan information comprising the selected Height parameter and a minimum-Shutterinterval value that is either uploaded from device 130 as part of flight plan information or pre-configured in camera 300.

In other embodiments, flight speed S is calculated by companion computer 310a as follows:

$$S = T/D_{image} \tag{9}$$

where T is a pre-configured value, as previously noted, and $D_{image}$ is a characteristic image distance uploaded as part of flight plan information (e.g., ShutterDistance) or calculated by companion computer 310a using uploaded flight plan information, as previously noted.

In general, $N_{PICS}$ is the total number of images to be captured by a board 310 during a single sub-part ("leg") of a survey mission (or during a survey mission, where the mission has only one leg). In some embodiments, $N_{PICS}$ may be calculated as follows:

$$N_{PICS} = D_{Flight}/D_{image} \tag{10}$$

where $D_{Flight}$ is distance covered by the flight lines for the mission sub-part/leg being flown (or total distance, D, covered by the flight lines for the entire mission, where the entire mission has only one part/leg). The total distance, D, may be calculated by the mission planning application on device 130, as described above, where the mission has only one leg. Alternatively, $D_{Flight}$ for a particular leg may be calculated separately by companion computer 310a and/or by device 130 for the individual leg of the overall mission. $N_{PICS}$ may be calculated by the mission planning application on device 130 and uploaded as part of the mission plan information, or may be calculated by companion computer 310a.

Required parameters, including T and $N_{PICS}$, are calculated as described and assigned to variables by camera boards 310. In some embodiments, companion computer 310a determines required parameters and communicates them to the other camera boards 310 for local assignment. In other embodiments, each camera board 310 determines the required parameters and assigns them to variables.

In some embodiments, the companion computer 310a provides the primary communication channel between camera 300 (e.g., camera boards 310), on the one hand, and autopilot 250 on the other hand. In some embodiments, any material system messages and data are routed to/from companion computer 310a via autopilot 250, while in other embodiments companion computer 310a may communicate directly with system components other than via the autopilot 250 (e.g., telemetry, IMUs, ground station components). In one or more embodiments, such companion computer 310a communication may be accomplished through the MAV-Link or similar protocol and/or MAVproxy communications, although any suitable protocols may generally be employed.

In one or more embodiments, a geographic information communication channel/data stream is opened between companion computer 310a and autopilot 250 and available for image capture routines executing on one or more camera boards 310, comprising GNSS, IMU and/or time information (e.g., latitude, longitude, altitude, heading, and current time). In one or more embodiments, the geographic information from the channel is parsed and assigned to local variables including, but not limited to: timepic (the timestamp for the geotag data); latitude, longitude, altitude, absaltitude (absolute altitude), and header (flight heading).

Figure 10:
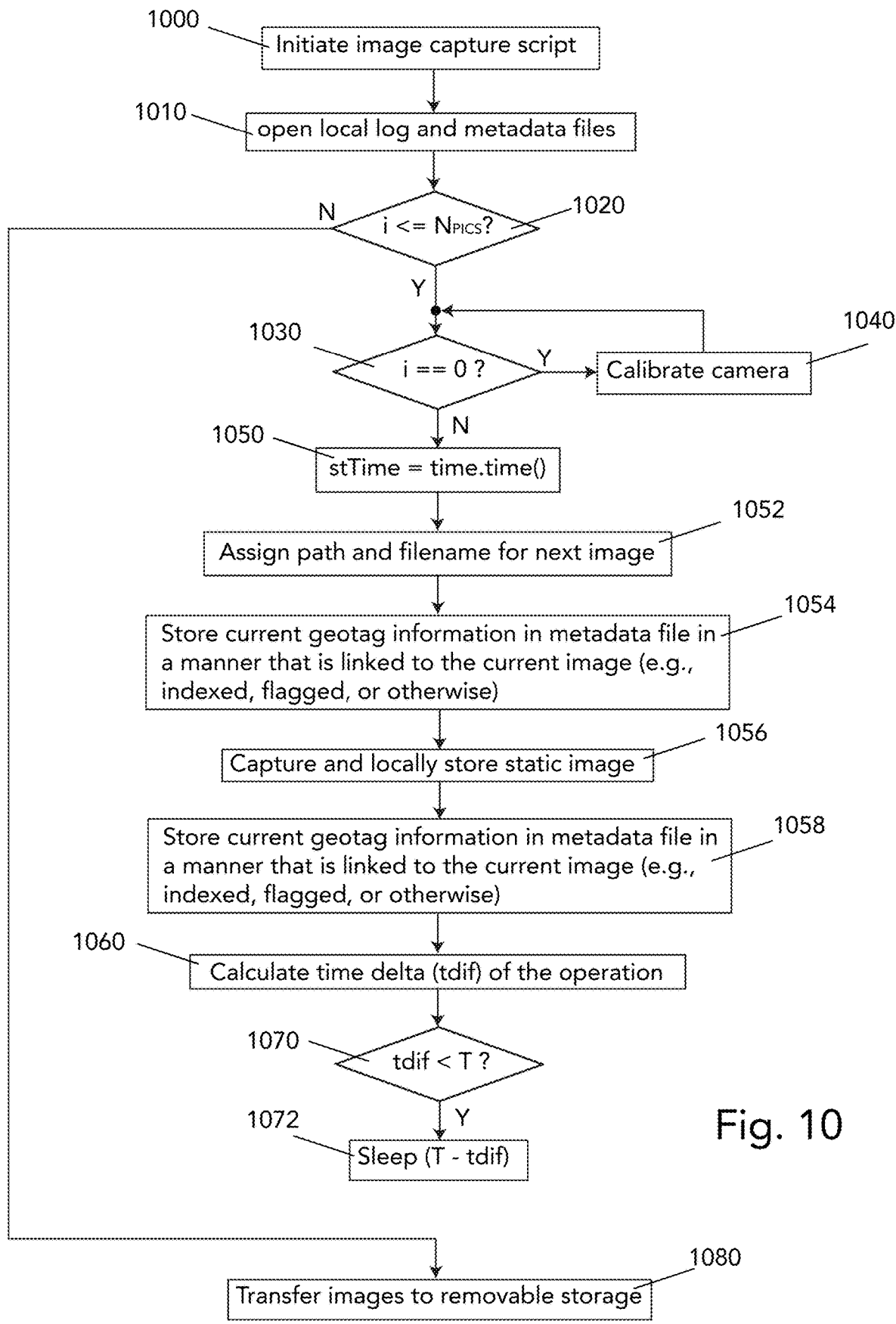
FIG. 10 is a flowchart illustrating a method for a UAV to recursively capture static survey images and associated metadata based on a characteristic time delay, according to various embodiments of the present disclosure.

With reference to FIG. 10, in one or more embodiments companion computer 310a executes an image capture method comprising the following steps. At step 1000, the image capture method is initiated. In one or more embodiments, companion computer 310a may initiate the image capture method based on GNSS location information. For example, in some embodiments, companion computer 310a may initiate the image capture method based on receiving GNSS position information from autopilot 250 indicating that the first waypoint/starting waypoint has been reached by the UAV. Other embodiments may base the trigger determination based on additional information, such as heading information, current time information, and/or UAV mode information.

At step 1010, companion computer 310a specifies a local directory and opens a log file (e.g., a text file) and a metadata file (e.g., text file).

In one or more embodiments, companion computer 310a executes the main body of the image capture method, comprising steps 1020-1072.

At step 1020, companion computer 310a tests the loop condition by determining if the value of the loop index (e.g., index "i") is less than or equal to $N_{PICS}$. If not, then the loop is exited and the images are transferred as per step 1080. If yes, then at step 1030 the method determines if the image to be captured is the first image of the series (e.g. if the current loop index "i" is equal to 0). If yes, then at step 1040 the method calibrates the camera by reading various parameters from the camera module, including but not limited to awb gains and shutter speed, and writes them to the log file. In some embodiments, the calibration may also include variables such as exposure mode.

If not, then the method may cause the camera to capture a static image and store it locally along with geolocation/geotag information. In some embodiments, geotag information that is stored with each image (e.g., exif data) may be utilized. However, in one or more preferred embodiments, geolocation information (current location) that is immediately preceding and following the image capture may be stored in the metadata file and linked to the static image for later processing (e.g., stitching). The local process is as follows. At step 1050, the method assigns the current time to a start time variable (e.g., "stTime"). At step 1052, the method assigns the current storage path to a local directory and filename that indicates the current loop index number on local storage (e.g., on storage 340a), such that the image is stored using a filename indicative of the current loop index number "i". At step 1054, the method reads and stores parsed geotag information from the geolocation information channel/data stream, along with the index number and current time, in the metadata file. At step 1056, the method triggers the local camera module to capture a static image using one or more functions or routines known in the art (e.g., the raspistill command) and stores the image to the previously assigned path and filename. At step 1058, the method again reads and stores parsed geotag information from the geographic information channel/data stream, along with the index number and current time, in the metadata file.

At step 1060, the start time (stTime) is subtracted from the current time and the difference is assigned to a variable (e.g., "tdif").

At step 1070, a determination is made whether the difference (tdif) is less than the characteristic image capture time delay (T). If yes, at step 1072 a time delay (sleep function) is set for the method to continue its execution by looping back to step 1020 upon the passage of the differential period, T—tdif (i.e., the time remaining until the next T period). If no, the method continues its execution by looping back to the step 1020, without adding any time delay.

At step 1080, after $N_{PICS}$ have been captured and stored locally (e.g., in storage 340a), the UAV returns to launch and companion computer 310a transfers the image files, and log and metadata files, to secondary/removable storage 340b (e.g., USB storage) and unmounts the storage once the transfer has occurred. Thereafter, a user may remove the storage in order to transfer the image, log, and metadata files to a different machine for subsequent processing (e.g., image stitching).

Exemplary pseudo-code for a portion of an exemplary image capture method is set forth in Table 4, below.

TABLE 4

```
# declared variable "tpics" is set to the (distance between pictures) / (drone
  speed)
# declared variable "total_pics" is set to the (total mission leg distance, D) /
  (distance between pictures)
define image_capture (total_pics, tpics, dateTime):              # Image capture loop
    declare variables to hold parsed geotag data (e.g., "timepic", "latitude",
    "longitude", "altitude", "absaltitude", "header")
        open camera log .txt file
        open camera metadata .txt file
        for in in range (total_pics):
            if (i ==0):
                read shutter speed value from camera module and write
                to log file
                read AWB gains value from camera module and write to
                log file
            else:
                set variable stTime to current time         # e.g., time.time( )
                set local dir and file path for saving images in a manner
                that indicates the relative number of the image          # e.g.,
                '/home/device/Pics' + str(i) + '.jpg'
                write current geotag information, current time, and
                current index number to metadata file
                trigger image capture
                write current geotag information, current time, and
                current index number to metadata file
```

TABLE 4-continued

```
        write relative time of picture to log file          # e.g., time.time( )
        – stTime
        set tdif variable to current time minus stTime.     #e.g.,
        time.time( ) – stTime
        if (tdif < tpics):
                sleep for duration, tpics – tdif
mount local USB key
transfer images to mounted USB key and shutdown
write indication of transfer completion in log
```

In some embodiments, camera boards other than the companion computer 310a execute a simpler image capture method than the one performed by companion computer 310a. In these embodiments, the camera boards do not include steps dealing with reading or writing geotag information, and simply perform static image captures once every characteristic time period.

Image Capture-Distance Based

In general, in some embodiments, the image capture method performed by camera 300 may be based on ensuring a characteristic distance between each image, wherein a static image is captured by each board 310 each time the UAV has traversed a characteristic distance. In some embodiments, the method may capture images until a certain number of images ($N_{PICS}$) have been captured; in others, until an endpoint coordinate/geolocation, $G_{Last}$, has been reached. In one or more embodiments, $G_{Last}$ may be a latitude/longitude coordinate calculated by the mission planner as being at or near the last waypoint for the mission leg and uploaded as part of the mission plan information. In some embodiments, the image capture method is written in Python script, although any suitable language may be used.

In one or more embodiments, the companion computer 310a provides the primary communication channel between camera 300 (e.g., camera boards 310), on the one hand, and autopilot 250 on the other hand. In some embodiments, any material system messages and data are routed to/from companion computer 310a via autopilot 250, while in other embodiments companion computer 310a may communicate directly with system components other than via the autopilot 250 (e.g., telemetry, IMUs, ground station components). In one or more embodiments, such companion computer 310a communication may be accomplished through the MAV-Link or similar protocol and/or MAVproxy communications, although any suitable protocols may generally be employed.

In one or more embodiments, a geographic/geolocation information communication channel/data stream may be opened between companion computer 310a and autopilot 250 and available for image capture routines executing on one or more camera boards 310, comprising GNSS, IMU and/or time information (e.g., latitude, longitude, altitude, heading, and current time). In one or more embodiments, the geographic information from the channel may be parsed and assigned to local variables including, but not limited to: timepic (the timestamp for the geotag data); latitude, longitude, altitude, absaltitude (absolute altitude), and header (flight heading).

In one or more embodiments, companion computer 310a monitors geolocation data and initiates an image capture process in companion computer 310a and any additional camera boards 310 (e.g., two of the three camera board 310 referenced above) upon reaching the first location for capturing images (e.g. the first waypoint in a flight plan). In one or more embodiments, the method may test the loop condition to determine if the value of the loop index (e.g., index "i") is less than or equal to $N_{PICS}$. Alternatively, the method may test the loop condition to determine if the current geolocation is at or near $G_{Last}$. If the loop condition is satisfied, then the loop is exited and the images are transferred to removable storage, as previously described above. If not, then the method determines if the image to be captured is the first image of the series (e.g. if the current loop index "i" is equal to 0). If yes, then the method calibrates the camera by reading various parameters from the camera module, including but not limited to awb gains and shutter speed, and writes them to a current log file. In some embodiments, the calibration may also include variables such as exposure mode. In addition, the method triggers a static image capture, stores the current geolocation information as $X_{last}$ (described below), and increments the loop index, i.

If not, then the method calculates the difference, $D_{Delta}$, between the current geolocation, $X_{current}$, and the last geolocation for which an image capture was triggered $X_{last}$. Next, the method determines if $D_{Delta}$ is greater than or equal to a characteristic distance, $D_{image}$, between each image. In some embodiments, $D_{image}$ is the ShutterDistance value, calculated as previously noted by device 130 and uploaded to camera 300 as part of the flight plan information. In other embodiments, $D_{image}$ is determined by companion computer 310a as noted previously. If not, the method continues to test the $D_{Delta}$ condition using current geolocation information until the condition is met. Once met, the method triggers a static image capture process using one or more methods and libraries known in the art (e.g., raspistill). Metadata (e.g., exif data) may be written in the corresponding image file that includes geolocation and time information characteristic of the location and time of the image capture, and the image may be stored locally using a naming convention that indicates the number of the image in the set of images to be stored (e.g., by using the value of the current loop index, i). The current geolocation is assigned to $X_{last}$ and the loop index is incremented, returning execution back to the loop entrance.

Image Processing-Pixelwise Orthomosaic Stitching

In general, the system and methods disclosed herein employ a novel image stitching approach to minimize geometric lens distortion and increase pixel information fidelity. In one or more exemplary embodiments, images are stitched into an orthomosaic in a manner that increases and/or maximizes the number of pixels present in the mosaic that are in relatively close proximity to the optical axis of the optical sensor/camera lens, thereby reducing geometric distortion present in the mosaic. Unless context suggests otherwise, in the descriptions of the embodiments herein, the optical axis is assumed to orthogonally intersect the center of the sensor array.

Generally, each UAV (e.g., UAV 120, UAV 300) returns to a predetermined location once a mission plan is completed (or a mission sub-plan is completed, where the mission plan comprises multiple sub-plans/legs). In some embodiments, autopilot 250 may execute a return-to-launch (RTL) command once the image capture script is completed and/or once the last waypoint in the list of mission waypoints has been overflown. In one or more exemplary embodiments, each camera board 310 transfers its set of image files stored locally on primary storage 340a (along with any metadata and log files) to its secondary/removable storage 340b during the return flight and unmounts the removable storages and indicates a ready state (by, e.g., an LED status indicator) once the files have been transferred. In other embodiments, each camera board 310 transfers its set of image files stored locally on primary storage 340a (along with any metadata and log files) to its secondary/removable storage 340b in a manner that indicates the set of images is associated with a particular mission plan or sub-plan (e.g., in a directory or folder system) for later unmounting (e.g., after additional mission plans or sub-plans have been flown).

For clarity, after a flight plan has been successfully flown and files have been successfully transferred, the secondary/removable storage 340b for each camera board 310 may have stored thereon information comprising at least one set of image files (numbering $N_{PICS}$). In one or more embodiments, the camera board 310a (i.e., the companion computer) may also have stored thereon at least one metadata file and at least one log file, for those embodiments that store geotag metadata separately from the image files. In other words, in the exemplary embodiments previously referenced having three camera boards 310 corresponding to three camera modules 320 (where one module comprises an RGB lens/sensor, one comprises a BBP lens/sensor, and one comprises an RBP lens/sensor), after landing, the UAV may have stored in secondary storage at least three sets of images (each numbering $N_{PICS}$), where one set comprises images captured from the RGB camera (the RGB set), one set comprises images captured from the BBP camera (the BBP set) and one set comprises images captured from the RBP camera (the RBP set). Note that in those embodiments that store multiple sets of images corresponding to multiple plans or sub-plans, the relevant discussion may be considered to relate to the individual sets of images corresponding to a given plan or sub-plan.

In one or more embodiments, at least one of the secondary storages may also have stored thereon at least one metadata file containing geotag information linked to the ordered set of images. In general, the images may be stored in any manner sufficient to maintain the relative order of the images within the image-capture process. For example, in one or more embodiments, the images may be stored in a flat file system in which each image file is named in a manner that indicates the order in which the each image was captured, in relation to the rest of the images (e.g., each image file name containing the image capture loop index number, i). In such embodiments that contain a separate metadata file, each "geotag" (e.g., each entry of geolocation information) may be linked to the relevant image file in any manner sufficient to provide the desired functionality. For example, in one or more embodiments, each geotag contains a number or other index indicative of the image file with which it is associated.

After the UAV has landed and the image sets and metadata have been successfully transferred to removable storage, a user may remove the secondary storage and thereafter transfer the images and metadata to another processing device, such as a personal computer (e.g., local device 130b), in order to, e.g., stitch each set of images into an orthomosaic. For example, the set of images retrieved from the RGB camera may be stitched into an RGB orthomosaic of the surveyed area; likewise with the BBP and RBP camera image sets.

Figure 11:
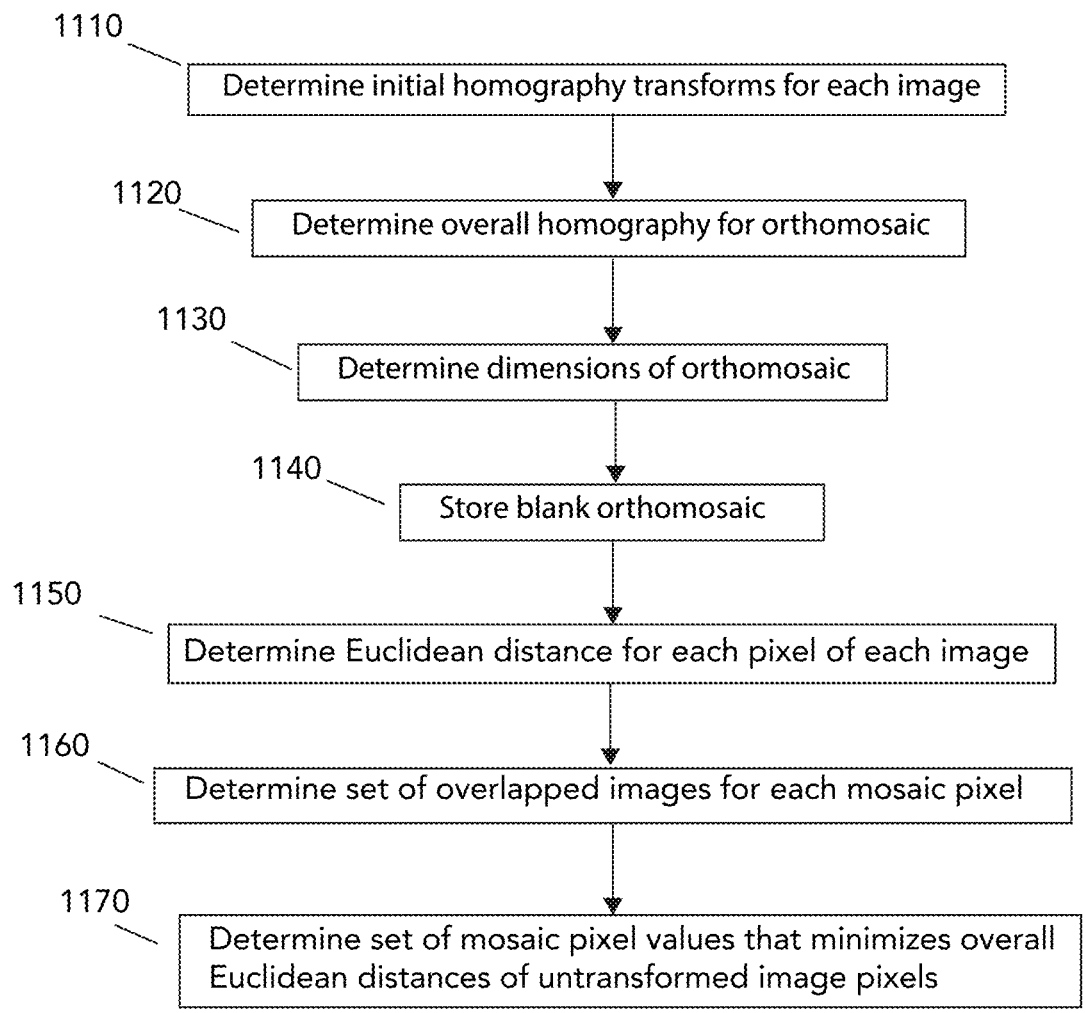
FIG. 11 is a flowchart illustrating a method for generating an orthomosaic from a base set of images having reduced geometric distortion, according to various embodiments of the present disclosure.

With reference to FIG. 11, in one or more embodiments the device (e.g., device 130) executes instructions that implements an image processing technique to stitch the images into an orthomosaic. In some embodiments, the technique includes one or more steps 1110 to initially find homography transformations for each image in a set of images loaded to it (n=$N_{PICS}$) (e.g., RGB, BBP, and/or RBP images) (each referred to herein as a "base" set of images), with respect to its neighbor images as overlapping allows it. As previously indicated, in those embodiments in which multiple sets of images are stored corresponding to multiple flight plans or sub-plans, the discussion pertains to each set.

Figure 12B:
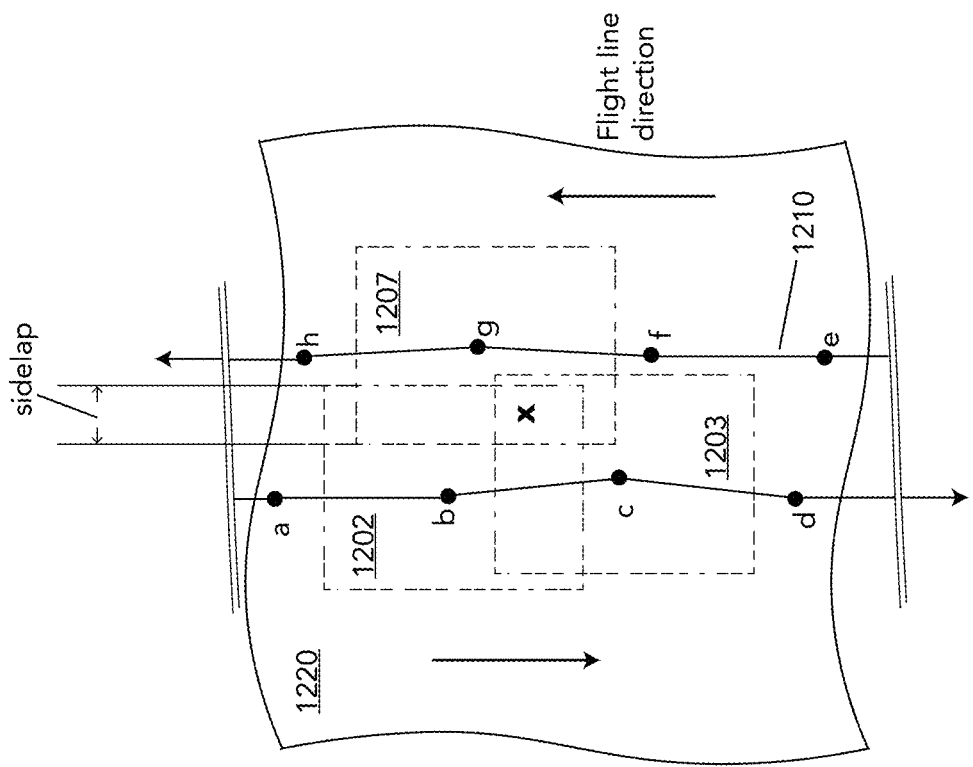
FIG. 12B is a diagram illustrating a portion of two consecutive flight lines and the images captures during survey flight, together with associated geolocation information, according to various embodiments of the present disclosure.
Figure 12A:
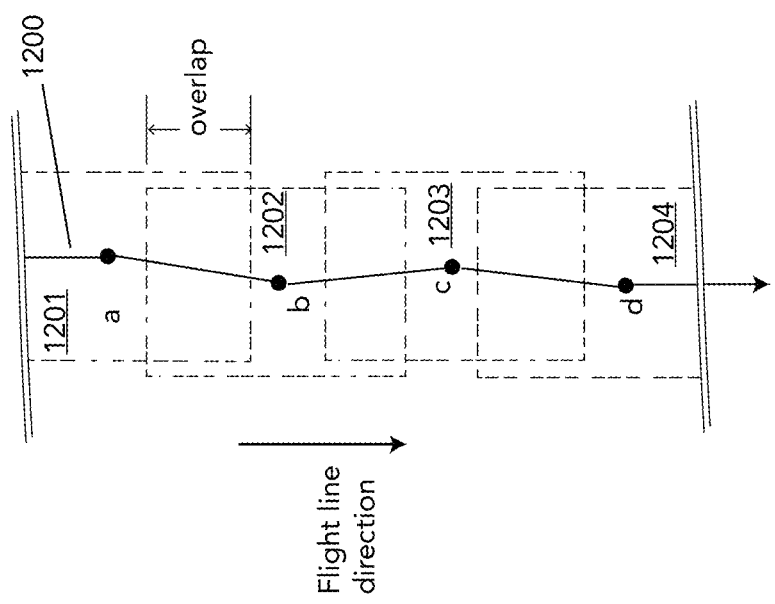
FIG. 12A is a diagram illustrating a portion[s] of a flight line and the image captures during survey flight, together with associated geolocation information, according to various embodiments of the present disclosure.

In some embodiments, for each image in a base set of images, a set of potential neighbors is determined. Generally, any suitable manner of determining potential neighbors may be utilized. In one or more embodiments, geotag information associated with the base set of images may be utilized to determine sets of potential neighbors. With reference to FIG. 12, portions of two flight lines 1200, 1210 are illustrated in relation to an overflight of a portion of a field 1220, together with a few images 1201-1204, 1207, captured during the overflight. In one or more embodiments, geolocation information (spatial coordinates) stored in the geotags may be utilized to associate a spatial position (e.g., latitude, longitude, altitude coordinates) with each image. For example, in those embodiments of the systems and methods described above that make two coordinate reads (prior to/post image capture) and store them in association with other image metadata, the system may average the coordinates for the image and assign the average coordinates to the image. As illustrated in FIG. 12, the image spatial coordinates for images 1201-1204, 1207 are represented by coordinate markers a-d, and g, respectively. Generally, the systems and methods herein may utilize image spatial coordinate in any suitable manner to assist in determining image potential neighbors. For example, in some embodiments, one or more sorting methods may be employed to determine potential neighbors. In some embodiments, spatial coordinates may be utilized in combination with image number/index.

Figure 13:
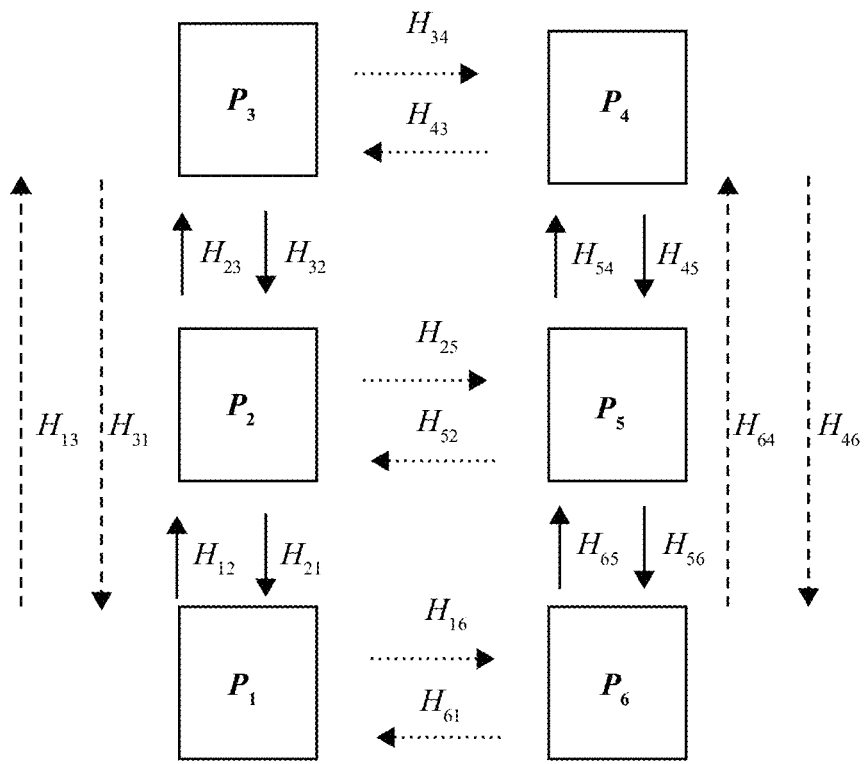
FIG. 13 is a diagram illustrating the homography transformation relationships between a portion of a set of potential neighbor images, according to various embodiments of the present disclosure.

In general, initial homography calculations may be determined in any suitable manner sufficient to provide the desired functionality described herein. In one or more embodiments, potential image neighbors may be utilized by the systems and methods described herein to generate initial homography calculations. For example, with reference to FIG. 13, in one or more embodiments, the transformation of picture i with respect to its potential neighbor picture j may be given by the homography matrix calculation $H_{ij}$ of order 3. In one or more embodiments, a potential neighbor is considered a neighbor by the systems and methods herein only if there exist more than 5 matching data points, classified as inliers, in the relevant overlapping region (e.g., front overlap, sidelap) of the two images, i and j; in some preferred embodiments, the requirement is more than 10 inliers; in other preferred embodiments, the requirement is more than 20 inliers. The matching data points may be classified as inliers by a series of algorithm constraints to assure an adequate transformation. The homography calculation of picture j with respect to picture i, $H_{ji}$ may be given by the inverse of the matrix $H_{ij}$. For the initial homography calculations, an affine transformation may be pursued instead of a projective transformation. In that case, the non-linear effects of the picture to be transformed are ignored by preserving parallelism, and the transformed picture may only be translated, rotated, scaled, and sheared. FIG. 13 illustrates the number of homographies calculated based on six pictures and assuming that the overlap/sidelap allows to find inliers within two consecutive pictures.

At step 1120, the overall homography for the orthomosaic is determined. In general, any suitable manner of generating the overall mosaic homography may be employed. In one or more embodiments, in generating the orthomosaic homography, one image from the base set of images may be selected as the root image, $P_{root}$, and remains unmodified (no transformation is applied to it) by, for example, applying an identity matrix, $I_{iden}$, of order 3 to it. A nearest neighbor approach may be implemented to find the shortest sequence of each image $P_i$ with respect to $P_{root}$ in which homography may be given by the product of the homography matrices found along that sequence. For example, for the images shown in FIG. 13 and choosing $P_1$ as the root:

TABLE 5

| | |
|---|---|
| $H_1 = I_{iden}$ | (1) |
| $H_2 = H_1 * H_{12}$ | (2) |
| $H_3 = H_1 * H_{13}$ | (3) |
| $H_4 = H_1 * H_{13} * H_{34}$ | (4) |
| $H_5 = H_1 * H_{16} * H_{65}$ | (5) |
| $H_6 = H_1 * H_{16}$ | (6) |

It is noted that, in some embodiments, the inliers of all matched image pairs may be stored for a subsequent optimization stage in which the values of the homography matrices are refined based on an optimization scheme that follows a Levenberg-Marquardt algorithm. The optimization scheme is intended to correct for small errors accumulated during the calculation of the homographies and to correct for image drifts as it can be observed from FIG. 13 that the homographies between $P_2$ and $P_5$ were not considered in the nearest-neighbor homography calculations scheme; however their inliers may be included in the optimization stage to minimize the global errors of the entire orthomosaic.

At step 1130, once the homographies for each image have been calculated, the dimensions of the orthomosaic may be determined by multiplying each image dimension by its respective homography matrix. At step 1140, a blank version of the mosaic may be stored in memory for subsequent population by pixel data.

In general, in one or more embodiments disclosed herein, the systems and methods for stitching orthomosaics include one or more steps for populating the blank orthomosaic with pixel values (intensity values) based on the base image set of pixel values. Whereas existing systems and methods generally blend and/or otherwise modify pixel values from untransformed images in the hope of reducing stitching lines and/or reducing geometric image distortion, in the systems and methods described herein, the pixel values from the base (untransformed) set of images are not blended or modified, but instead may be selected in a manner that seeks to minimize geometric distortion by maximizing the use of base pixel values that are relatively closest to the optical axis of an image, where geometric distortion is at a minimum.

For example, in one or more embodiments herein, pixel data from the untransformed set of images is evaluated and utilized according to the minimum Euclidean distance of each image pixel $p_i$, with respect to the image center $(x_{i0}, y_{i0})$, using the assumption that the image center is on or in close proximity to the optical axis for the image. For example, the distance between an image pixel, p (in an untransformed image), with coordinates (x,y), to the (untransformed) image center $(x_0, y_0)$ is calculated as follows:

$$d_{x,y} = \sqrt{(x-x_0)^2 + (y-y_0)^2} \quad (11)$$

Continuing, at step 1150, the Euclidean distance of each image pixel in each image is calculated and stored in a manner to associate each distance value with the pixel for that image.

Where each mosaic pixel $p_i$ is located at the coordinates of the mosaic $(x_i, y_i)$, the best pixel value for that specific location may be given by the pixel value of the untransformed image in which Euclidean pixel distance to the image center is minimum. That is, if in the $(x_i, y_i)$ location, a given set, r, of transformed pictures overlap that location, which set is determined at step 1160, then at step 1170 the best pixel value $I(p_i)$ for that mosaic pixel may be selected from the set of values obtained from the set of images, r, as the pixel value of the untransformed picture which Euclidean distance to its center is minimum, as expressed in the following statement:

$$I(p_i) = \min(d_{x1,y1}, d_{x2,y2}, \ldots d_{xr,yr}) \quad (12)$$

Figure 14A:
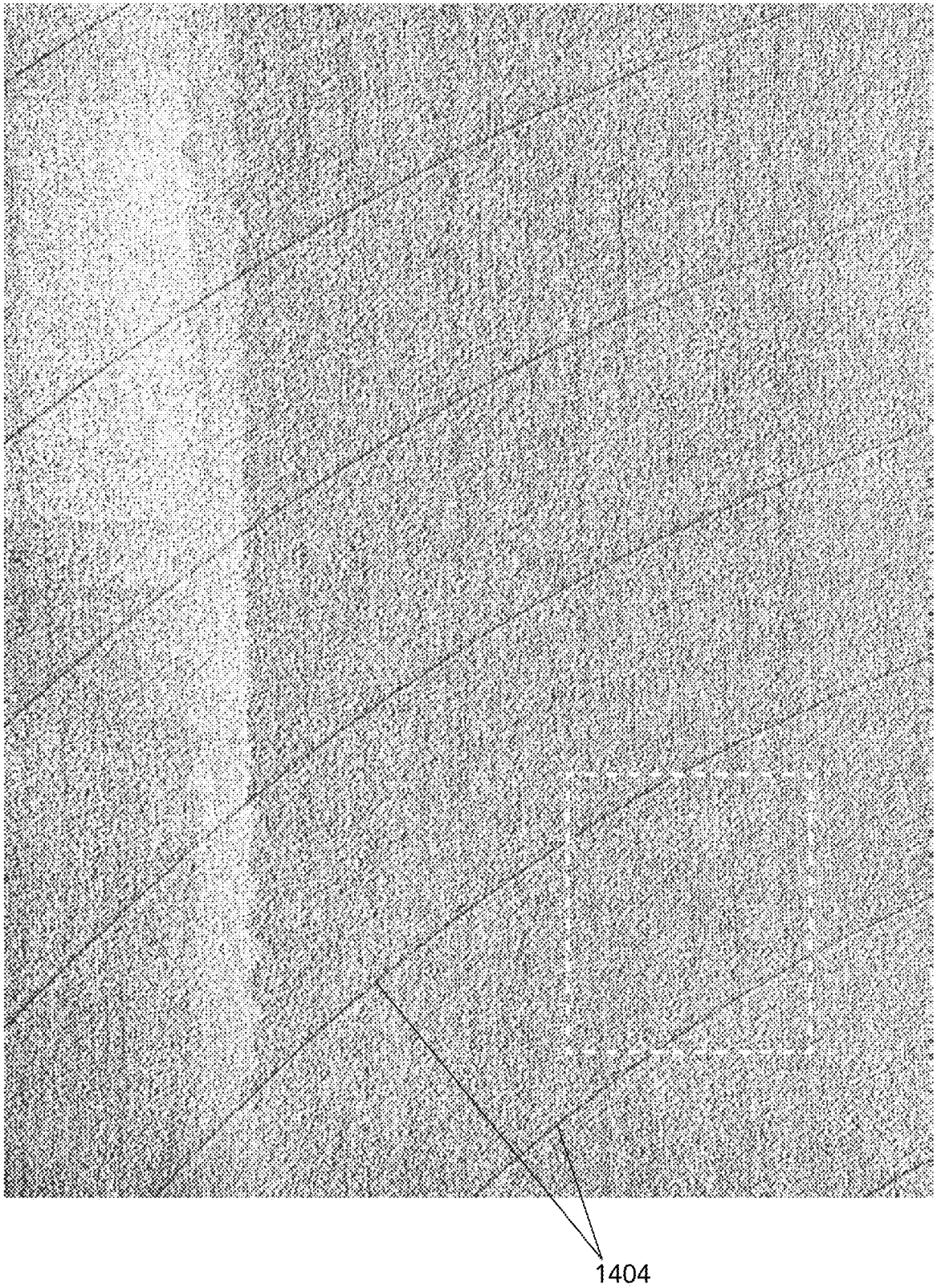
FIG. 14A is an image illustrating an exemplary orthomosaic generated according to various embodiments of the present disclosure.
Figure 14B:
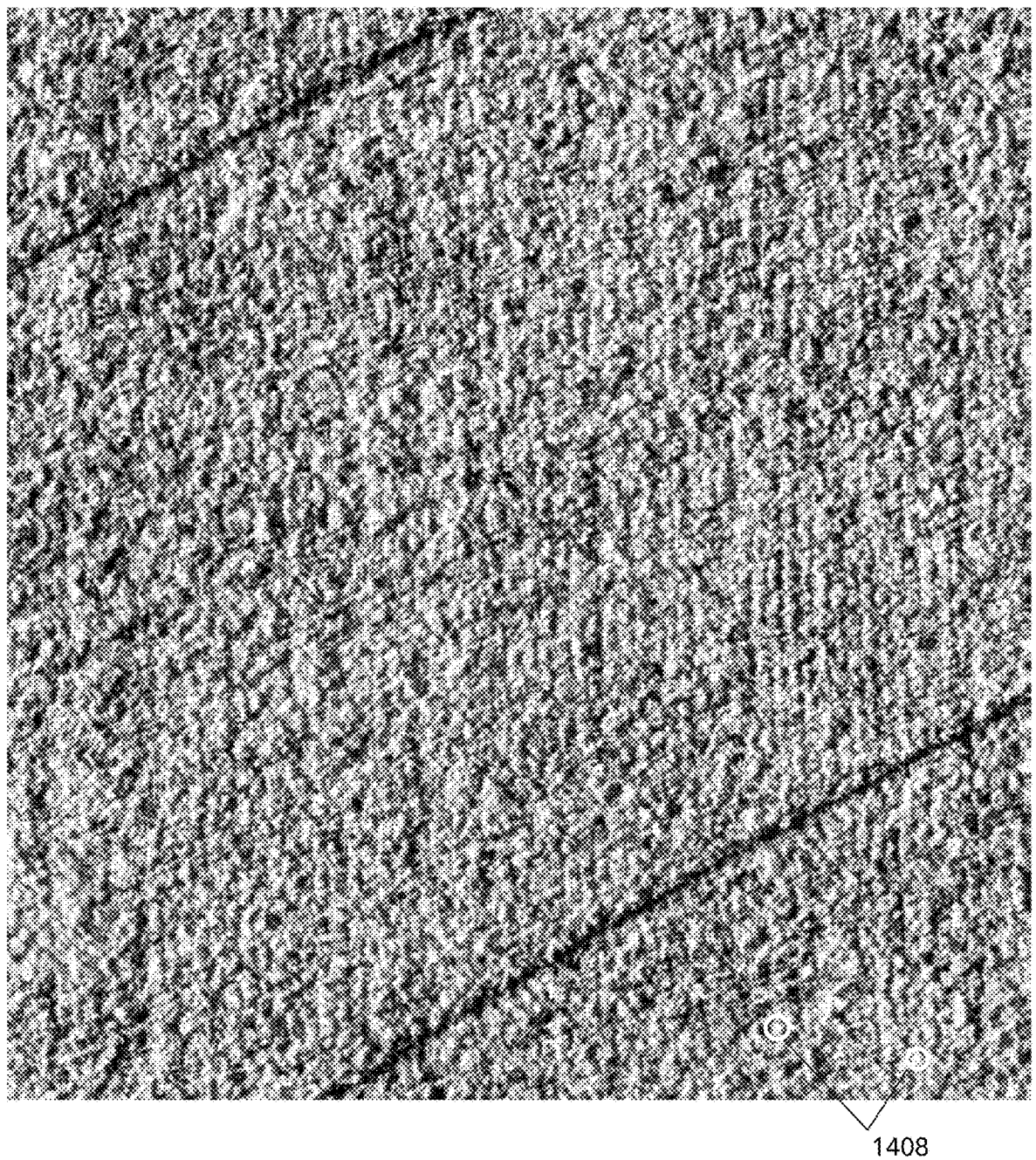
FIG. 14B is a magnified portion of the image shown in FIG. 14A.

Populating the blank mosaic matrix with the minimum pixel values in this manner, an orthomosaic with reduced geometric distortion may be generated. For illustration, FIG. 14A shows an exemplary mosaic, in which a set of images from an overflight of a crop field was generated by the systems and methods disclosed herein. FIG. 14B shows a magnified portion of the mosaic of FIG. 14A. As illustrated, the mosaics generated by the systems and methods herein have high resolution and low distortion. For example, the tracks from water-pivots are illustrated by curved lines 1404, while individual crops are visible as shown by representative artifacts 1408. These exemplary mosaics may be captured by the drones disclosed herein from an elevation of up to 400 feet above ground.

Figure 14C:
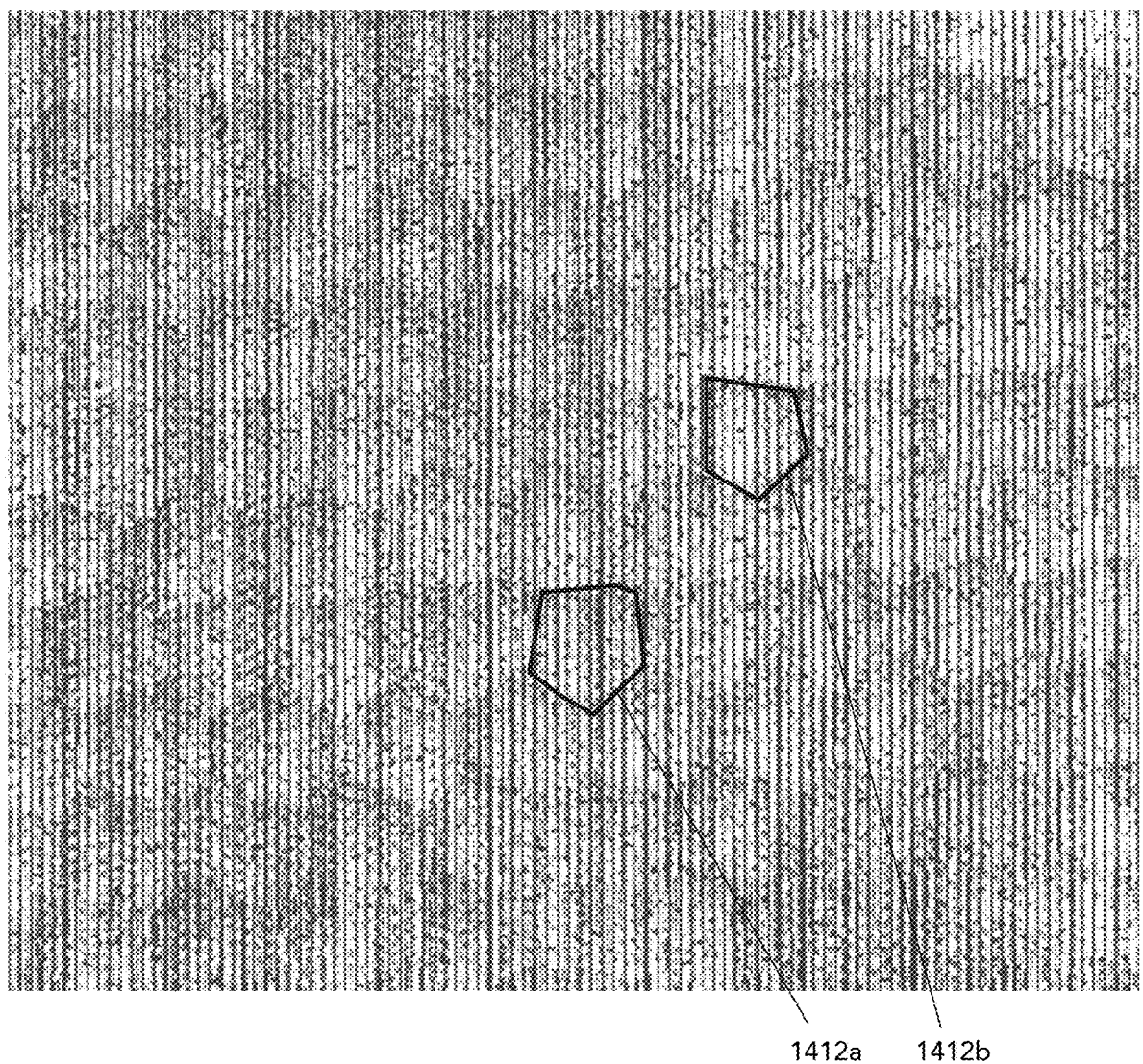
FIG. 14C is an image illustrating an exemplary orthomosaic generated according to various embodiments of the present disclosure, showing an indication of stitching boundaries.

FIG. 14C shows another exemplary mosaic generated by the systems and methods herein, in which the boundaries between individual tiles (image remnants) have been accentuated. As shown in FIG. 14C, the tile boundaries are determined by the system using the approach described above, in which pixel values have been selected by the system from the image set pixels based on minimization of distance from the optical axis of the constituent images. Accordingly, the boundaries are irregular and non-homogenous, as shown by representative boundaries 1412a,b. This is in contrast to methods that seek to homogenize or blend boundaries in a mosaic.

Exemplary pseudo-code for pixel-wise selection of mosaic pixel intensities having minimized distortion according to one or more embodiments of the present disclosure is set forth in Table 6, below.

TABLE 6

```
for (i=0; i< num_mosaic_columns; i++)
    for (j=0; j< num_mosaic_rows; j++)
        minimum_distance = length_of_the_mosaic_diagonal
```

TABLE 6-continued

```
    index = -1
    for (k=0; k < num_pictures; k++)
        i_untransformed(k) = i + minimum_mosaic_coordinates_along_x -
        minimum_transformed_coordinate_of_picture k_along x
        j_untransformed(k) = j + minimum_mosaic_coordinates_along_y -
        minimum_transformed_coordinate_of_picture k_along y
        Calculate Euclidean_distance_of_coordinates (i_untransformed(k),
        j_untransformed(k)) with respect to the center of picture k
        if (minimum_distance > minimum_distance(k))
            minimum_distance = minimum_distance(k)
            index = k
            Keep( i_unstransformed(index), j_unstransformed(index))
        end if
        if (index > -1)
            Pixel_values_of_mosaic_at (i,j) =
            Pixel_values_of_picture(index)_at(i_untransformed(index),
            j_untransformed(index))
        end if
    end for
end for
``` where (i,j) are mosaic pixel coordinates.

In some embodiments, the pixel-wise selection optimization may be processed in a partially parallel manner. Generally, any parallel processing techniques may be employed sufficient to provide the functionality described herein, including but not limited to CUDA parallelization using unified memory (UM) and C++ code. In these embodiments, two main classes may be utilized: (1) the main CPU class in which pixel information of each individual image is sent to a GPU and (2) the GPU class in which the mosaic is populated with the optimized RGB pixel values previously referenced. Generally, the main CPU class processes the information of each individual image, and GPU calls may be set at every image processed by the main CPU class. The resulting mosaic is populated with each individual pixel value selected on the GPU running the pixel-wise optimization previously referenced.

Figure 15A:
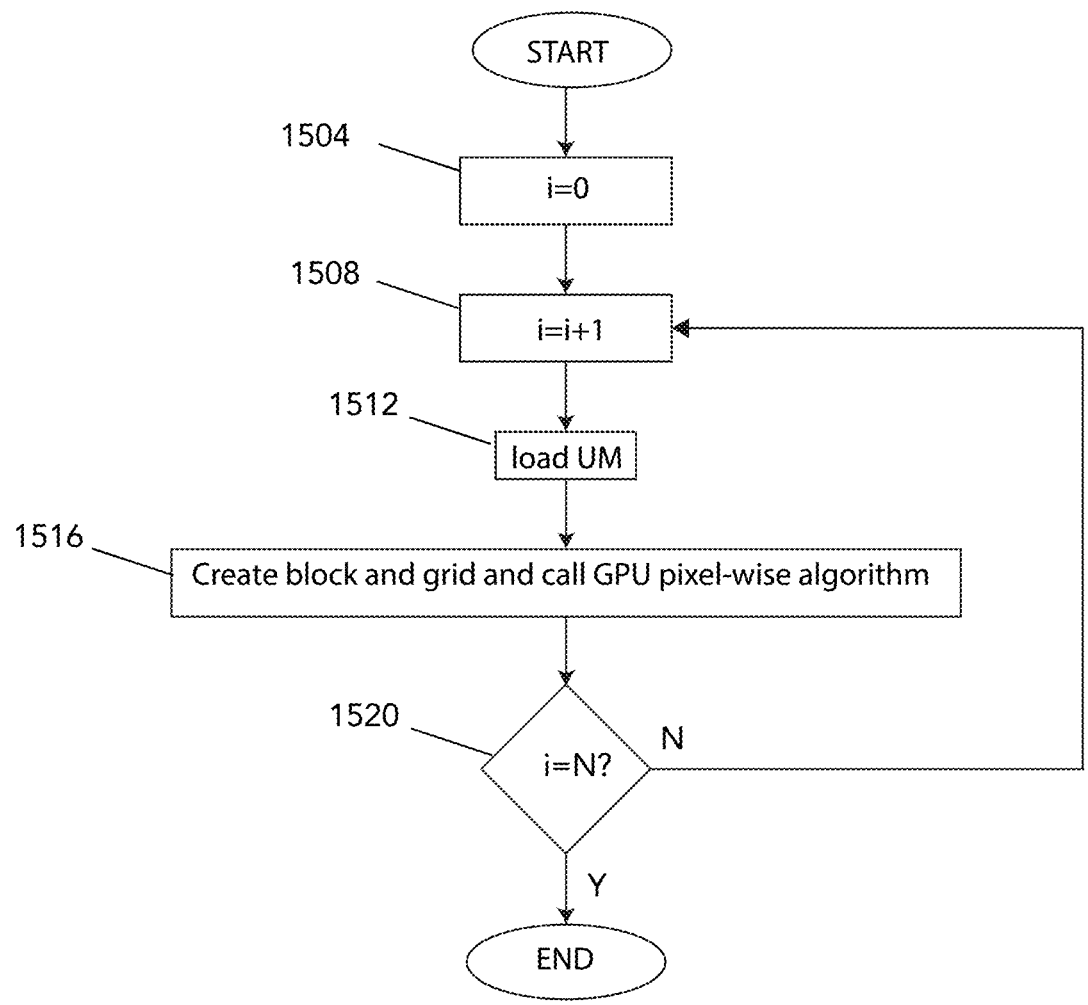
FIG. 15A is a flowchart illustrating a method for pixel-wise orthomosaic pixel selection having reduced geometric distortion, according to various embodiments of the present disclosure.

More specifically, and with reference to FIGS. 15A (CPU class) & 15B (GPU class), at steps 1504 and 1508 the system initializes and increments an index to initiate the mosaic build. At step 1512 the unified memory is loaded with mosaic and image data. Generally, any data sufficient to accomplish the functions herein may be loaded. In one or more embodiments, at least mosaic size data, image (e.g., image pixel) data, and image center data (e.g., location on mosaic) is loaded to unified memory. In some embodiments, image pixel data and image center data are loaded. In some embodiments, image nearest neighbor data is loaded. Note that a reader of ordinary skill will appreciate that at least the mosaic data and at least a portion of the image center data are obtained from prior image homography processing by the system, as described above.

At step 1516, the system initializes one or more GPU blocks and grids to parallelize the pixel-wise optimization processing, and makes individual calls on the GPU to run the pixel-wise optimizations. At step 1520, the system evaluates if the index is equal to the number of pictures in the set, and if not returns to step 1508 to increment the counter and make another call to process the next image in the set in parallel. Otherwise, the mosaic build is ended.

Figure 15B:
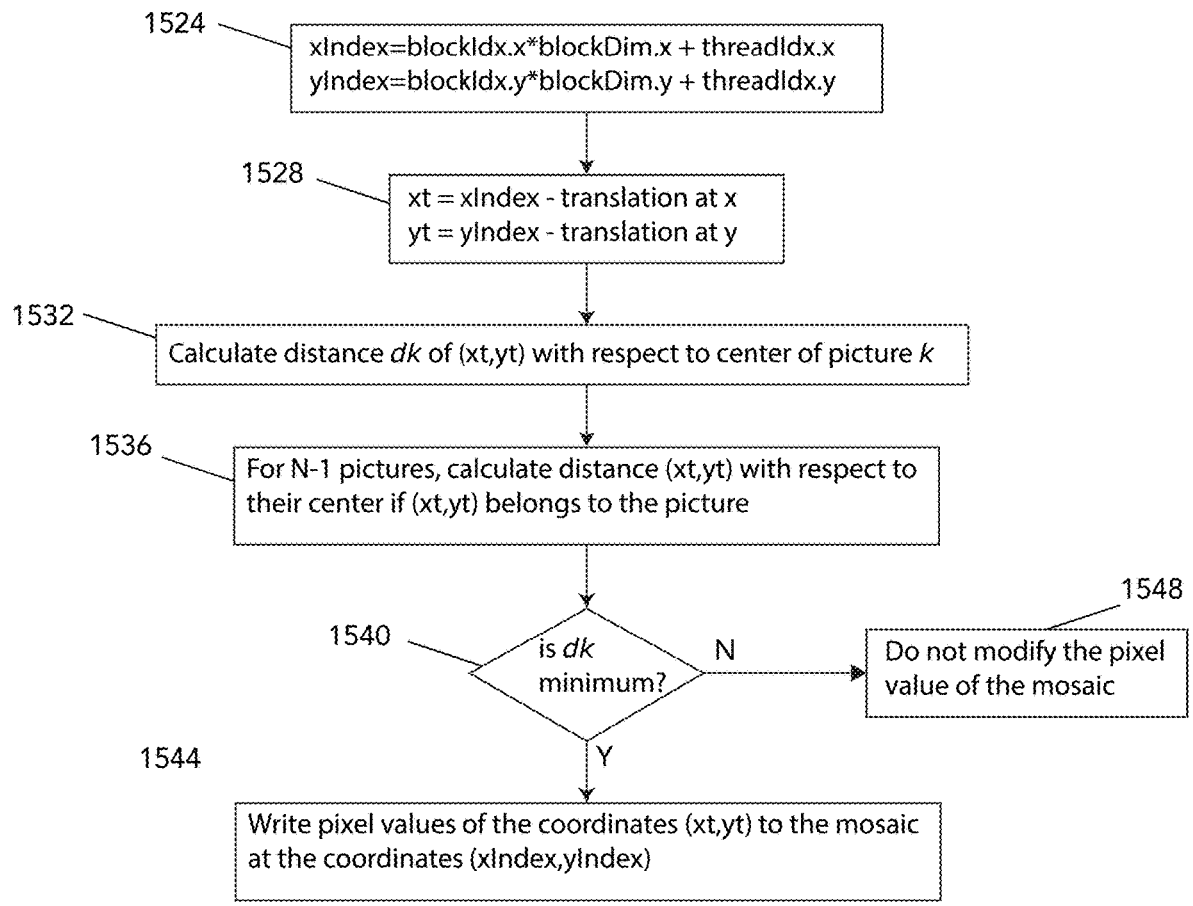
FIG. 15B is a flowchart illustrating a method for computing the pixel-wise selection in a parallel fashion.

FIG. 15B illustrates one non-limiting embodiment for accomplishing the pixel-wise optimization of mosaic pixel values using a parallel process. At step 1524, the coordinate (xIndex, yIndex) of the current mosaic pixel to be processed are determined. At step 1528, the relevant pixel coordinate for the image being evaluated is calculated by translating the mosaic pixel using relevant homography data, as described above. At step 1532, the linear distance dk of the image pixel (xt, yt) from the relevant image center is determined. At step 1540, the linear distance is evaluated to determine if it is a minimum distance among the set of nearest neighbor images for the mosaic pixel being determined (xIndex, yIndex). If so, at step 1544 the system writes the pixel value of that image pixel (xt, yt) to the mosaic at the coordinate (xIndex, yIndex). If not, at step 1548, the system does not write the pixel value and proceeds to evaluate another candidate pixel from the nearest neighbors.

As may be appreciated, in a system for evaluating crop or vegetation indices, the quality of the mosaic data is important—the indices being materially impacted by the mosaic data. In one or more embodiments of systems herein, mosaics generated by the systems and methods described may be analyzed to calculate one or more vegetation indices, such as DVI, NDVI, GDVI, soil adjusted NDVI, etc.

Figure 16:
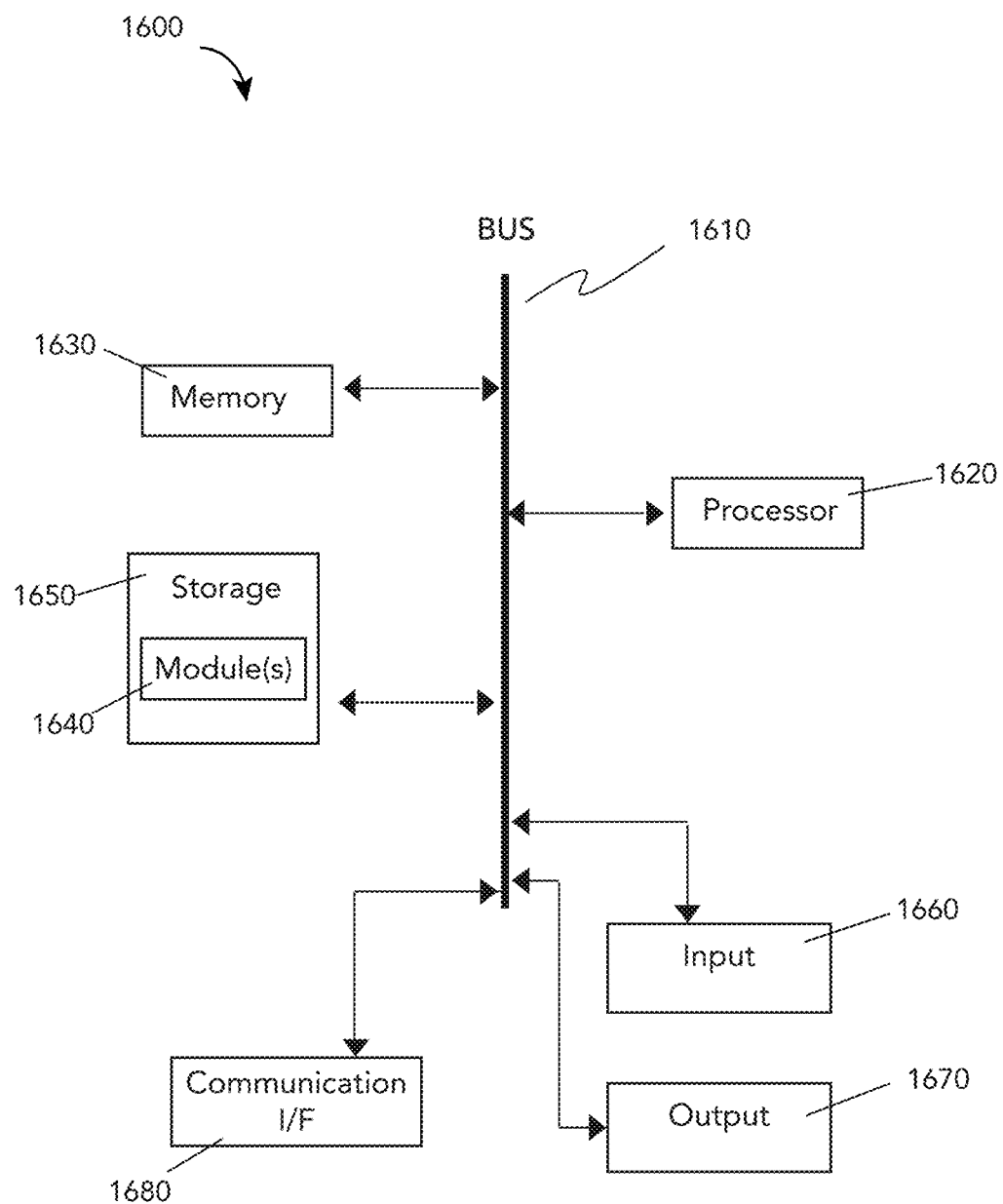
FIG. 16 is a block diagram illustrating an exemplary computing system/computing environment in which various embodiments or portions of embodiments of the present disclosure may be implemented.

Turning now to FIG. 16, illustrated is a logical arrangement of a set of general components of a basic general purpose system or computing device 1600 (for example, a general purpose computer) which may be employed to practice embodiments or portions of the embodiments of the present disclosure. System bus 1610 ties system components including system memory 1630 (e.g., ROM and/or RAM) to processor 1620. System bus 1610 may generally be any suitable type of bus structure using any suitable bus architecture, such as for example, a memory bus or controller, a peripheral bus, or a local bus. Information transfer to/from the bus (and components) may be accomplished by any suitable means, such as for example a BIOS stored in ROM 1630 or the like. System memory 1630 may include other and different types of memory than ROM/RAM. Computing device 1600 may have more than one processor 1620 or may comprise a group or cluster of computing devices 1600 networked together to provide greater processing capacity. Processor 1620 may include any general purpose processor, with our without one or more hardware or software modules 1640 stored in storage device 1650, configured to control processor 1620, as well as any special-purpose processor. Computing device 1600 may include storage 1650 (e.g., flash disk drive, hard disk drive, magnetic or optical disk drive, or the like). Storage device 1650 may include one or more software modules 1640 for controlling processor 1620. In general, the drives and the associated non-transitory computer readable storage media provide nonvolatile storage of computer readable instructions, data structures, program modules and data for computing device 1600. A person of ordinary skill in the art would know how to make variations to the basic components described to suit a particular function or need. Non-transitory computer-readable storage media expressly exclude media such as energy, carrier signals, electromagnetic waves, and signals per se.

With continuing reference to FIG. 15, computing device 1600 may comprise input device 1660 and output device 1670. In general, input device 1660 may be any number of input means, such as a microphone for speech, a touch-sensitive screen for gesture or graphical input, a keyboard, mouse, and the like. Also in general, output device 1670 may any number of output means, such as for example a visual monitor (LCD, CRT, etc.), a printer, and the like. Communications interface 1680 generally governs and manages the user input and system output. A person of ordinary skill in the art would know that the basic features described here may easily be substituted for improved hardware or firmware arrangements as they are developed.

The exemplary system of FIG. 16 is illustrated as including individual functional blocks. In general, the functions represented by these blocks may be provided through the use of either shared or dedicated hardware, including but not limited to, hardware capable of executing software and hardware that is purpose-built to operate as an equivalent to software executing on a general purpose processor. Some embodiments may include general processor, microprocessor and/or digital signal processor (DSP) hardware, read-only memory (ROM) (e.g., memory 1630) for storing software performing the operations described herein, and random access memory (RAM) for storing results. Logical operations of various embodiments described herein may be implemented as, for example, a sequence of computer implemented steps, operations, or procedures running on a processor or processing resource within one or more general or specific-use computers. System 1600 may practice all or part of the recited methods, may be a part of the recited systems, and/or may operate according to instructions in the recited non-transitory computer-readable storage media. Such logical operations may be implemented as modules configured to control processor 1620 to perform particular functions according to the programming of the module.

Embodiments within the scope of the present disclosure may also include tangible and/or non-transitory computer-readable storage media for carrying or having computer-executable instructions or data structures stored thereon. Such non-transitory computer-readable storage media may be any available media that can be accessed by a general purpose or special purpose computer. Non-limiting examples may include: RAM, ROM, EEPROM, flash memory or other memory, CD-ROM, DVD or other optical disk storage, magnetic disk storage or other magnetic storage devices, or any other medium which can be used to carry or store desired information (e.g., program code means in the form of computer-executable instructions, data structures, or processor chip design). When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions may include, for example, instructions and data which cause a general purpose computer, special purpose computer, or special purpose processing device to perform a function or group of functions. Computer-executable instructions may also include program modules that are executed by computers in stand-alone or network environments. In general, program modules may include routines, programs, components, data structures, objects, and the functions inherent in the design of special-purpose processors, etc. that perform particular tasks or implement particular abstract data types. Computer-executable instructions, associated data structures, and program modules may represent examples of the program code means for executing steps of the methods disclosed herein. A particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure. We therefore claim as our invention all that comes within the scope of these claims.

We claim:

1. A system for generating a stitched orthomosaic with decreased geometric distortion, comprising:
    a processing environment having at least one processor and storage that is accessible to the at least one processor; and
    a base set of images obtained from a survey mission and stored in the storage, wherein each image has georeferenced metadata associated with it and each image has an image center,
    wherein the storage has instructions stored therein that, when executed by the at least one processor, causes the system to
    (a) for each image, identify a set of neighbor images from the base set, wherein an image is considered a neighbor with another image only if a sufficient number of inliers exists between the images, wherein the inliers are defined as matching data points in relevant overlapping regions of the images,
    (b) select one of the base set of images as a root image,
    (c) determine, by the at least one processor, homographies in relation to the root image for each of the remaining images, wherein the homographies are based on finding homography transformations for each image in a set of images by using a homography matrix calculation,
    (d) determine, by the at least one processor, dimensions for an orthomosaic of the base set of images using the homographies, (e) determine, by the at least one processor, an overlapping set of images for each orthomosaic pixel, (f) determine, by the at least one processor, a set of potential pixels and potential pixel values for each orthomosaic pixel, wherein the set of potential pixels is the set of corresponding image pixels in the overlapping set of images for the orthomosaic pixel, (g) determine, by the at least one processor, a distance value for each potential pixel, wherein the distance value is determined based on linear distance between the potential pixel and image center, (h) determine, by the at least one processor, a minimum distance pixel in each set of potential pixels by identifying the potential pixel of the set having the smallest distance, and (i) populate, by the at least one processor, each orthomosaic pixel with the pixel value of the minimum distance pixel determined for the set of potential pixels associated with each orthomosaic pixel.

2. The system of claim 1, wherein a sufficient number of inliers is at least 20 inliers.

3. The system of claim 2, wherein the distance value is calculated using the Euclidean distance formula.

4. The system of claim 1 wherein the at least one processor comprises at least one central processing unit (CPU) and at least one graphical processing unit (GPU) sharing a unified memory, wherein step (a)-(e) are performed by the CPU and steps (f) and (g) are performed by the GPU in a parallel manner.

5. An unmanned aerial vehicle (UAV) system for surveying an area according to a surveying mission plan, comprising:

a UAV configured to execute a surveying mission plan having a payload of at least one camera;

a user device executing a mission planning application configured to generate the surveying mission plan based on a user's input specifying an area to be surveyed and a characteristic flight altitude for flying a survey mission according to the surveying mission plan, wherein the surveying mission plan comprises an ordered set of flight path waypoints, wherein the system is configured to recursively trigger the camera to capture static images based on either a characteristic time delay, T, or a characteristic distance between each static image, $D_{image}$.

6. The system of claim 5, wherein the mission plan further comprises and endpoint location, $G_{Last}$, and wherein the camera captures a static image after each lapse of $D_{image}$ until the UAV has reached a location at or near the endpoint location.

7. The system of claim 5, wherein the mission plan further comprises and endpoint location, $G_{Last}$, wherein the at least one camera comprises a first camera processor coupled to a first camera memory, a first camera storage, and a first camera fixed-lens optical sensor module, a second camera processor coupled to a second camera memory, a second camera storage, and a second camera fixed-lens optical sensor module, and a third camera processor coupled to a third camera memory, a third camera storage, and a third camera fixed-lens optical sensor module, and wherein each of the first, second, and third camera storages has instructions stored therein that when executed by the first, second, and third camera processors, respectively, causes each of the first, second, and third sensor modules, respectively, to generate a first, second, and third set of static images by recursively capturing and storing a static image after each lapse of $D_{image}$, until the UAV has reached a location at or near an endpoint location, $G_{Last}$.

8. The system of claim 7, wherein at least one of the fixed-lens optical sensor modules is optically filtered by a triple bandpass optical filter.

9. The system of claim 5, wherein the at least one camera comprises no more than three camera modules each comprising a camera processor coupled to a camera memory, a camera storage, and a camera fixed-lens optical sensor module, wherein one of the fixed-lens optical sensor modules is triple bandpass filtered configured to pass three narrow portions of electromagnetic spectrum centered on 475 nm, 550 nm, and 850 nm wavelengths.

10. The system of claim 9, wherein one of the fixed-lens optical sensor modules is triple bandpass filtered configured to pass three narrow portions of electromagnetic spectrum centered on 550 nm, 650 nm, and 850 wavelengths.

11. A system for simultaneously flying multiple unmanned aerial vehicles (UAVs) autonomously to survey an area, comprising:

a plurality of UAVs, each configured to autonomously execute one of a plurality of complementary survey mission sub-plans and each having at least one payload configured to autonomously perform a survey task;

a processing device having executable instructions stored therein that, when executed, cause the processing device to generate the plurality of complementary survey mission sub-plans, wherein the executable instructions, when executed, cause the processing device to generate a first user interface for receiving user fencepost input that characterizes a defined boundary for the area to be surveyed, wherein the executable instructions, when executed, cause the processing device to generate a second user interface for receiving an altitude parameter value from a user, wherein the processing device is configured to include a sub-plan parameter that is utilized by the processing device when executing the instructions to determine how many complementary sub-plans are required to perform the survey over the area, wherein the executable instructions, when executed, cause the processing device to determine a survey mission plan comprising an ordered set of flight path waypoints that covers the area using information comprising the fencepost input and the altitude parameter value and to generate the plurality of complementary survey mission sub-plans using the sub-plan parameter, and wherein each of the plurality of complementary mission sub-plans comprises an ordered subset of the flight path waypoints.

12. The system of claim 11, wherein the sub-plan parameter is a number that represents maximum authorized flight time for one of the plurality of UAVs to fly a sub-plan.

13. The system of claim 12, wherein the sub-plan parameter is a whole number representing in the system a maximum number of units to be associated with one leg of a flight path, wherein the unit is either a shutter distance value or a number of captured images.

14. A system for generating one or more vegetation indices from an orthomosaic generated from a base set of survey images of a crop field, comprising:

an unmanned aerial vehicle (UAV) configured to execute a surveying mission plan having a payload of at least one camera, wherein the at least one camera comprises at least one camera processor coupled to camera memory and camera storage, wherein the at least one camera processor is coupled to at least one fixed-lens optical sensor module, wherein camera storage has instructions stored therein that when executed by the at least one camera processor causes the at least one fixed-lens optical sensor module to generate a base set of static images by recursively capturing and storing a static image and its associated geolocation metadata, wherein the at least one fixed-lens optical sensor module is optically filtered by a triple bandpass optical filter that allows narrow portions of blue electromagnetic spectrum, green electromagnetic spectrum and near infrared (NIR) electromagnetic spectrum to pass;

at least one processing environment comprising at least one processor coupled to memory and storage having instructions stored therein that, when executed by the at least one processor, causes it to stitch the base set of static images into an orthomosaic and instructions that, when executed, cause it to generate at least one vegetation index using pixel intensity values from the orthomosaic.

15. The system of claim 14, wherein the narrow portions are centered on 475 nm, 550 nm, and 850 nm wavelengths.

16. The system of claim 14, further comprising instructions that, when executed by the at least one processor, cause it to,
(a) for each image in the base set of static images, identify a set of neighbor images from the base set of static images, wherein an image is considered a neighbor with another image only if a sufficient number of inliers exists between the images, wherein the inliers are defined as matching data points in relevant overlapping regions of the images,
(b) select one of the base set of images as a root image,
(c) determine, by the at least one processor, homographies in relation to the root image for each of the remaining images, wherein the homographies are based on finding homography transformations for each image in a set of images by using a homography matrix calculation,
(d) determine, by the at least one processor, dimensions for an orthomosaic of the base set of images using the homographies,
(e) determine, by the at least one processor, an overlapping set of images for each orthomosaic pixel,
(f) determine, by the at least one processor, a set of potential pixels and potential pixel values for each orthomosaic pixel, wherein the set of potential pixels is the set of corresponding image pixels in the overlapping set of images for the orthomosaic pixel, and
(g) determine, by the at least one processor, a distance value for each potential pixel, wherein the distance value is determined based on linear distance between the potential pixel and image center,
(h) determine, by the at least one processor, a minimum distance pixel in each set of potential pixels by identifying the potential pixel of the set having the smallest distance, and
(i) populate, by the at least one processor, each orthomosaic pixel with the pixel value of the minimum distance pixel determined for the set of potential pixels associated with each orthomosaic pixel.

17. The system of claim 14, wherein the at least one camera processor is coupled to a first fixed-lens optical sensor module, a second fixed-lens optical sensor module, and a third fixed-lens optical sensor module, wherein camera storage has instructions stored therein that when executed by the at least one camera processor causes each of the fixed-lens optical sensor modules to generate a base set of static images by recursively capturing and storing a static image and its associated geolocation metadata, and wherein at least one of the fixed-lens optical sensor modules is optically filtered by a triple bandpass optical filter that allows narrow portions of green electromagnetic spectrum, red electromagnetic spectrum, and NIR electromagnetic spectrum to pass.

18. The system of claim 17, wherein the narrow portions are centered on 550 nm, 650 nm, and 850 wavelengths.

19. The system of claim 18, wherein the at least one vegetation index includes one or more of a difference vegetation index (DVI), normalized difference vegetation index (NDVI), and generalized difference vegetation index (GDVI).

* * * * *